(12) United States Patent
Inoue et al.

(10) Patent No.: US 6,184,954 B1
(45) Date of Patent: Feb. 6, 2001

(54) LCD DEVICE WHEREIN SUM OF INTERNAL PRESSURE OF LIQUID CRYSTAL LAYER AND REPULSION OF SPACERS IS EQUAL TO ATMOSPHERIC PRESSURE

(75) Inventors: Kazuo Inoue, Hirakata; Seiji Nishiyama, Takatsuki; Tsuyoshi Uemura, Kadoma, all of (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/091,409

(22) PCT Filed: Oct. 23, 1997

(86) PCT No.: PCT/JP97/03852

§ 371 Date: Jun. 22, 1998

§ 102(e) Date: Jun. 22, 1998

(87) PCT Pub. No.: WO98/18043

PCT Pub. Date: Apr. 30, 1998

(30) Foreign Application Priority Data

Oct. 23, 1996 (JP) .................................................. 8-280713
Apr. 17, 1997 (JP) .................................................. 9-099910

(51) Int. Cl.⁷ ....................... G02F 1/1333; G02F 1/1339; G02F 1/13
(52) U.S. Cl. ............................ 349/86; 349/153; 349/155; 349/187
(58) Field of Search ...................... 349/86, 88, 153, 349/154, 155, 183, 187, 190

(56) References Cited

U.S. PATENT DOCUMENTS

| | | | |
|---|---|---|---|
| 5,087,114 | * 2/1992 | Fukui et al. | 359/81 |
| 5,307,190 | * 4/1994 | Wakita et al. | 359/82 |
| 5,420,706 | * 5/1995 | Yamazaki et al. | 359/67 |
| 5,548,429 | 8/1996 | Tsujita | 355/80 |
| 5,556,670 | 9/1996 | Mihara et al. | 428/1 |
| 5,566,008 | 10/1996 | Yoshida et al. | 359/51 |
| 5,636,043 | * 6/1997 | Uemura et al. | 359/81 |
| 5,766,694 | * 6/1998 | West et al. | 427/510 |
| 6,088,075 | * 7/2000 | Nakao et al. | 349/86 |

FOREIGN PATENT DOCUMENTS

| | | |
|---|---|---|
| 56102828 | 8/1981 | (JP) . |
| 59-38423 | 3/1984 | (JP) . |
| 3-215828 | 9/1991 | (JP) . |
| 4-319915 | 11/1992 | (JP) . |
| 4-361234 | 12/1992 | (JP) . |
| 7-43695 | 2/1995 | (JP) . |

\* cited by examiner

*Primary Examiner*—William L. Sikes
*Assistant Examiner*—Tarifur R. Chowdhury
(74) *Attorney, Agent, or Firm*—Greenblum & Bernstein, P.L.C.

(57) ABSTRACT

A polymer dispersed liquid crystal display element (100) in which liquid crystal (14) is dispersed in a polymer composite (15) is provided whereby gap width distortion resulting from sudden changes in temperature is prevented, and uniformity of the display image is improved. Distortion of the gap width between glass plates due to a temperature change within a specific temperature range is prevented by dispersing spherical resin spacers (16), which are resiliently compressed a specific percentage by two glass plates (11, 12) within a specific temperature range ($\Delta t$), in a liquid crystal layer (17) interposed between a glass plate (11) and another glass plate (12) that comprise a voltage application means (18, 19, 20, 21) and are mutually opposed through a seal member (13).

19 Claims, 18 Drawing Sheets

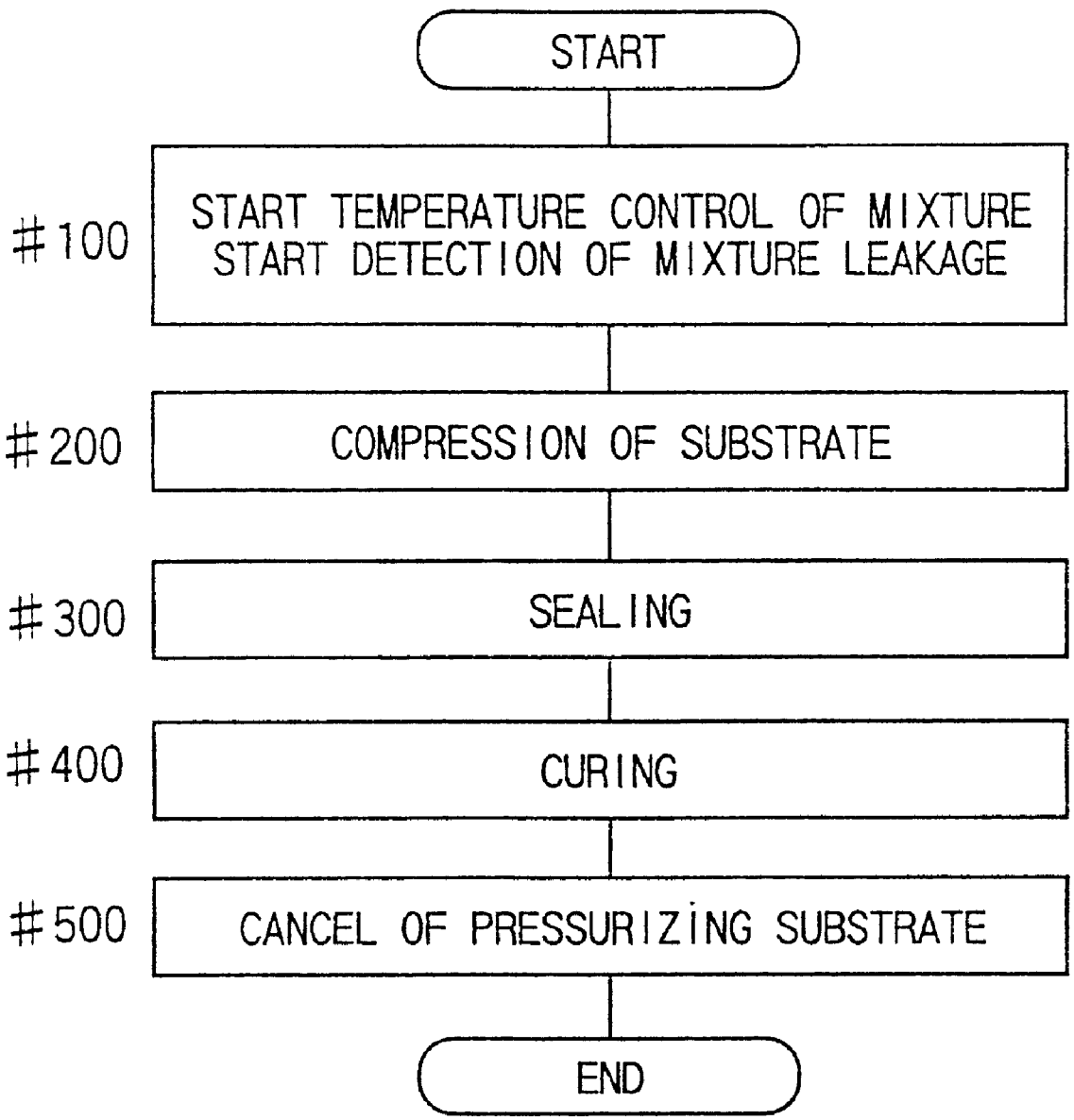

Fig.20
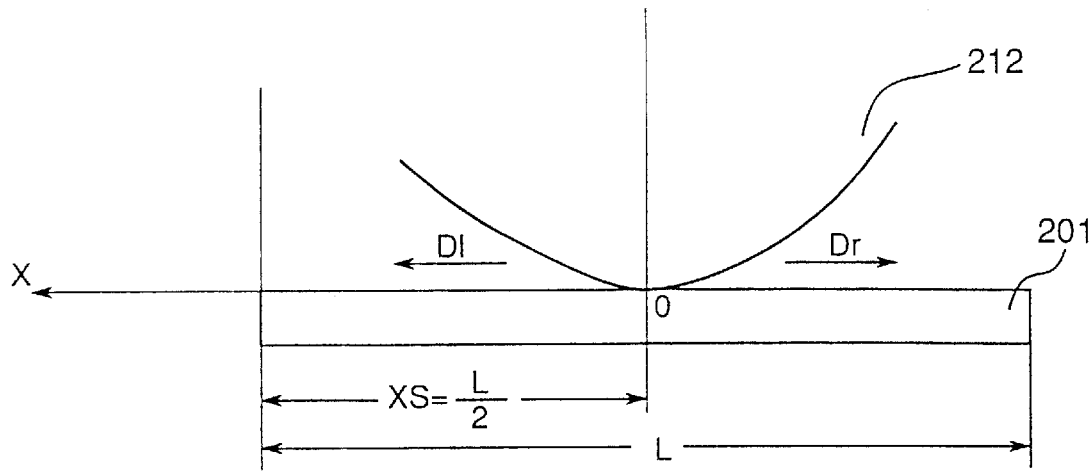
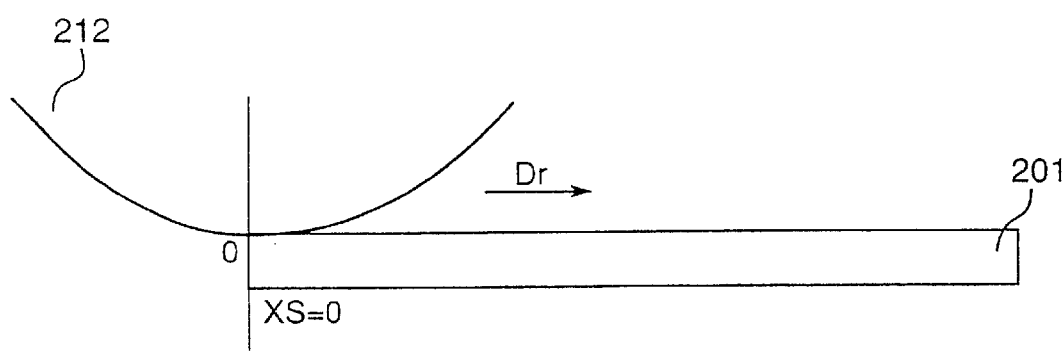
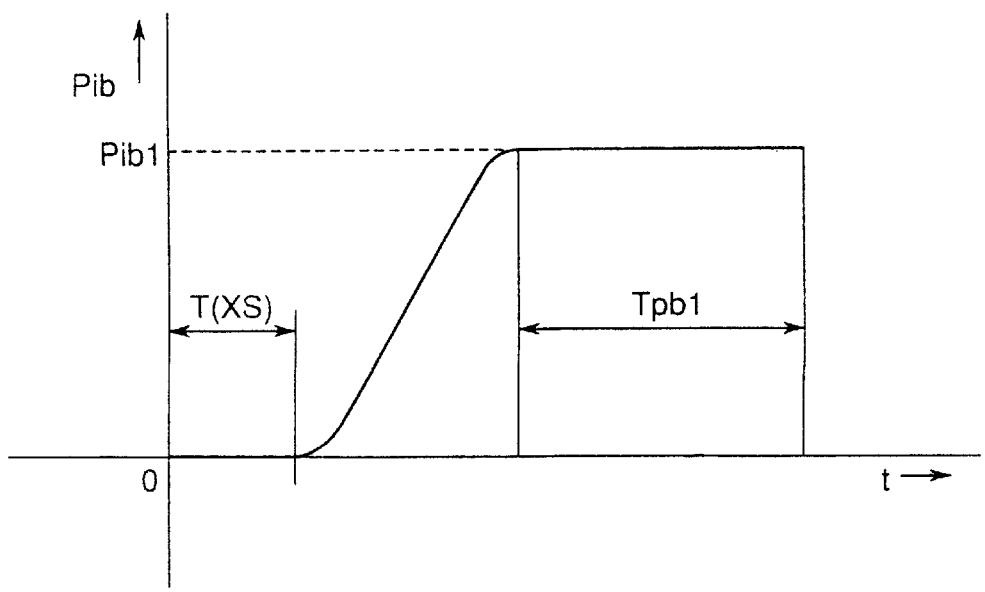

LCD DEVICE WHEREIN SUM OF INTERNAL PRESSURE OF LIQUID CRYSTAL LAYER AND REPULSION OF SPACERS IS EQUAL TO ATMOSPHERIC PRESSURE

FIELD OF TECHNOLOGY

The present invention relates to a liquid crystal display apparatus, and to a liquid crystal display element used as an optical shutter.

RELATED TECHNOLOGY

Liquid crystal display elements have become practical for use in flat, large-screen display devices in information processing devices, particularly portable personal computers, and televisions and other video products. Of the various LCD elements available, the polymer dispersed type has been of particular interest in recent years.

This polymer dispersed LCD element comprises a pair of glass substrates with a conductive coating, and disposed therebetween a liquid crystal layer in which liquid crystals are dispersed in as droplets or networked crystals in a polymer matrix. Depending upon whether a voltage is applied to the liquid crystal layer, the LCD element switches between a state transmitting or dispersing incident light from a backlight.

A conventional liquid crystal display element is described next below with reference to FIG. 9A, FIG. 9B, FIG. 9C, FIG. 12, FIG. 21, and FIG. 22. The structure of a polymer dispersed LCD element is shown first in FIG. 9A at normal temperature (e.g., 20° C.). LCD element 200 comprises glass plates 51 and 52, seal 53, liquid crystal 541 polymer matrix 55, and spacer 56.

The glass plates 51 and 52 each have a transparent electrode made from a conductive film of ITO (indium tin oxide). The polymer matrix 55 is a polymer compound with a three-dimensional networked structure. The liquid crystals 54 are liquid crystals dispersed in the polymer matrix 55. A liquid crystal layer 57 disposed between glass plates 51 and 52 is formed from the liquid crystals 54 and polymer matrix 55.

The seal 53 is coated to the circumferential edge of the glass plates 51 and 52, and seals the liquid crystal layer 57. A plurality of spacers 56 is distributed in the liquid crystal layer 57 to hold a constant gap width between the glass plates 51 and 52. A voltage application means, not shown in the figure, is disposed to the glass plates 51 and 52 for applying a desired voltage to the liquid crystal layer 57.

In a conventional polymer dispersed LCD element, the average particle diameter of spacers 56 is less than the gap width between the glass plates, and the internal pressure of the liquid crystal layer 57 is set lower than atmospheric pressure. Pressure pushing from the outside to the inside therefore acts on the liquid crystal layer 57, and the gap width between the two glass plates is held to the particle diameter of the spacer 56. It should be noted that the spacers 56 are the same as those used in a twisted nematic LCD element.

Referring below to FIGS. 9B and 9C, phenomena occurring in the conventional polymer dispersed shown in FIG. 9A as a result of a rapid change in temperature are described. FIG. 9B illustrates the state when the LCD element 200, which is shown in FIG. 9A at a normal temperature, rises from normal temperature to a high temperature (85 degrees C in this example), and FIG. 9C illustrates the state when the LCD element 200 drops rapidly from the high temperature state shown in FIG. 9B to normal temperature.

As shown in FIG. 9A, when the LCD element 200 is at normal temperature, substantially no pressure is applied by the glass plates 51 and 52 to the spacers 56 because the size of the spacers 56 is the same as the gap width. However, the volume of the matrix 55 and liquid crystals 54 increases when the temperature rises, and the internal pressure of the liquid crystal layer 57 therefore rises. Unlike the perimeter area, the middle portion of the glass plates 51 and 52 is not fixed by a seal 53 and therefore deforms due to the effect of this increased internal pressure, resulting in a gradual increase in the gap width from the perimeter area to the center. The expanded liquid crystals therefore collect in the center area, and the LCD element 200 deforms as shown in FIG. 9B.

When the LCD element 200 is then rapidly cooled to normal temperature from the state shown in FIG. 9B, the liquid crystal layer 57 contracts. The liquid crystals concentrated in the center cannot completely return to the original condition at this time, however, and a large part thereof is left in the middle. The gap between the glass plates 51 and 52 is therefore different in this area as shown in FIG. 9C.

Irregularity in the thickness of the liquid crystal layer is thus induced in a conventional polymer dispersed LCD element as a result of expansion and contraction of the liquid crystal layer caused by a rapid change in temperature, and a dramatic deterioration in display quality occurs as a result.

A first object of the present invention is therefore to resolve the above-described conventional problem by providing a liquid crystal display element whereby distortion of the gap width resulting from a sudden change in temperature can be prevented, and uniformity of displayed images can be improved.

The configuration of a conventional LCD element is described next referring to the partially exploded perspective view in FIG. 12. LCD element 140 comprises glass plates 131a and 131b, transparent electrodes 132a and 132b, seal 133, conductive material 134a and 134b, opening 135, active element formation area 136, and liquid crystal layer 137.

The glass plates 131a and 131b are transparent panels made of glass, each comprising an ITO (indium tin oxide) conductive film as a transparent electrode 132a and 132b. A seal 133 is formed near the perimeter of the glass plates 131a or 131b. The opening 135 is a discontinuity disposed in the seal 133, and is used for filling liquid crystals to the liquid crystal layer 137. Liquid crystals are injected to the liquid crystal layer 137 from the opening 135.

The active element formation area 136 is an area on transparent electrode 132b in which a TFT element is formed for each pixel of the LCD element 140. The conductive material 134a and 134b is a conductive paste coated to transparent electrode 131b, and electrically connecting transparent electrode 132a and transparent electrode 132b.

A vacuum injection method is generally used to inject a liquid crystal material to a conventional LCD element 140 thus comprised. In this method, an empty LCD element (140) with a liquid crystal layer 137 that has not been filled with liquid crystal, that is, an empty cell, is placed in a depressurized tank to create a vacuum inside the cell, and the tank is then returned to normal pressure with the opening 135 in contact with a liquid crystal material to inject the liquid crystal material to the cell.

In addition to penetrating the liquid crystal layer 137, the liquid crystal material also penetrates the gap between the glass plates 131 and 132 to the outside of the seal 133 (hereafter referred to as the "outside gap") when a liquid crystal material is thus injected to an empty LCD element 140. This occurs as a result of capillary action due to the height of the seal 133, that is, the width between the glass plates 131 and 132, being a gap of only plural micrometers. It is therefore necessary to wash and remove any liquid crystal material that has penetrated this outside gap after the opening 135 is sealed.

However, when liquid crystals penetrating said outside gap are removed by washing in the above-described conventional LCD element, the conductive material 134a and 134b is contaminated or removed in certain cases. When this occurs, the impedance between the transparent electrodes 132a and 132b is significantly increased and conductivity is impaired, leading to deterioration of the image quality of displayed images.

Therefore, a second object of the present invention is to resolve the above-described conventional problem by providing a LCD element and manufacturing method whereby the conductive material 134a and 134b is protected when washing and removing liquid crystals that have penetrated said outside gap, and reliability related to the quality of the LCD element is assured.

A manufacturing method for a conventional polymer dispersed liquid crystal panel is described next with reference to FIG. 21 and FIG. 22. A pair of glass plates 201 and 202 is first prepared by forming transparent conductive films 201a and 202a thereon in a desired pattern, washing, and then forming insulation layers 201b and 202b. A seal resin 203 in which injection opening 203a is formed is then formed by coating the perimeter of one of the glass plates 1 with a thermosetting resin or photosetting resin, and spacers 204, for example, spherical particles of $SiO_2$, for maintaining a specific substrate gap are distributed on the other glass plate 202. The glass plates 201 and 202 are then bonded face to face with seal resin 203 therebetween.

The seal resin 203 is then cured by exposure to heat or light, and the glass plates 201 and 202 bonded by means of the seal resin 203, that is, an empty panel, are placed in a vacuum chamber. After depressurizing the vacuum chamber to form a vacuum inside the empty panel consisting of glass plates 201 and 202, the pressure inside the vacuum chamber is returned to normal pressure with the injection opening 203a of seal resin 203 in contact with a mixture of polymer and liquid crystals stored in a storage vessel, thereby injecting mixture 205 to and filling the inside of the empty panel, that is, between glass plates 201 and 202.

It should be noted that the method whereby mixture 205 is filled between glass plates 201 and 202 using a process as described above is called a vacuum injection method, and is a method known widely in the literature. Continuing, after a seal resin 266 that is a thermosetting resin or photosetting resin is coated on the outside of the injection opening 203a, polymer dispersed liquid crystals 207 are obtained by phase separating the mixture 205 in a heating process or by irradiation with light. The seal resin 206 is then cured by a heating process or by irradiation with light to complete a polymer dispersed liquid crystal panel such as that of which the major components only are shown in FIG. 22.

Note that with a conventional method as described above, the injection opening 203a in the seal resin 203 is closed by curing a seal resin 206 after the polymer dispersed liquid crystals 207 are obtained by phase separation of a mixture 205. When the resin 206 shown in FIG. 21 is coated, however, air 208 can penetrate between the seal resin 206 and the mixture 205. If the above-described photosetting process is performed with air 208 trapped inside, bubbles 209 will be left interspersed between the seal resin 206 and polymer dispersed liquid crystals 207. If these bubbles have penetrated to the display pixel portion, irregular colors can result and good display quality cannot be achieved. In addition, oxygen in the air bubbles 208 gradually dissolves into the polymer dispersed liquid crystals 7, deteriorating liquid crystal panel quality, and reducing liquid crystal panel reliability.

The primary causes of such bubbles 209 being left are: volume contraction of the polymer dispersed liquid crystals 207 solidifying concomitantly with phase separation of mixture 205; and an inability to coat seal resin 6 to the inside of recesses 209, which are formed on the surface of mixture 205 contacting seal resin 206 by bubbles 209 as shown by the imaginary line in FIG. 22, as a result of even mixture 205 inside injection opening 203a being wiped away when the area around injection opening 203a is cleaned by wiping with a cloth before applying seal resin 206.

The present invention was conceived in consideration of the problems occurring in this conventional manufacturing method, and third object of the present invention, therefore, is to provide a manufacturing method for a liquid crystal panel whereby good display quality can be achieved and reliability can be improved.

DISCLOSURE OF THE INVENTION

To achieve the first object described above, a liquid crystal display element according to the present invention is a liquid crystal display element comprising a pair of opposing panels having a voltage application means and at least one being transparent, a liquid crystal layer disposed between said pair of opposing panels, and a plurality of spacers distributed inside said liquid crystal layer for maintaining a uniform gap between said opposing panels, said liquid crystal display element being characterized by said spacers having repulsion in a specific temperature range, and the sum of said spacer repulsion and the internal pressure of the liquid crystal display layer being equal to atmospheric pressure. Thus comprised, it is possible to prevent distortion of the gap as a result of a sudden temperature change, and the uniformity of displayed images can be improved.

In addition, a projection apparatus using a liquid crystal display element according to the present invention comprises a light source, screen, light control means for producing images by controlling transmission of incident light from a the light source using a liquid crystal display element according to the present invention, and a projection means for projecting said image to said screen. Using an liquid crystal display element according to the present invention in a projection apparatus thus comprised, a projection apparatus for enlarged projection of images displayed on the liquid crystal display element can be achieved.

To achieve the above second object, a liquid crystal display element according to the present invention comprises a pair of opposing panels each having a voltage application means and at least one being transparent, a liquid crystal layer disposed between said pair of opposing panels, a seal material disposed between said pair of opposing panels for sealing the liquid crystal layer, a conductive material for electrically connecting the voltage application means disposed on each of the pair of opposing panels, and a protective material surrounding said conductive material.

To achieve the above third object, a manufacturing method for a liquid crystal panel according to the present invention injects a polymer and liquid crystal mixture that becomes a polymer dispersed liquid crystal between a pair of panels bonded face to face on opposing sides of a seal resin in which an injection opening is formed, presses against the outside of the panels in a direction bonding the panels together until a small amount of the mixture leaks to the outside from the injection opening of the seal resin, then coats said seal resin in direct contact with the surface of the mixture, and shrink sets the seal resin and polymer dispersed liquid crystals. As a result, the seal resin is pulled into the injection opening in contact with the polymer dispersed liquid crystals, and the injection opening can be sealed without no bubbles between the seal resin and the polymer dispersed liquid crystals.

BRIEF DESCRIPTION OF THE DRAWINGS

FIG. 18 is a flow chart of the major operations of the sealing apparatus shown in FIG. 17.

FIG. 20 is used to describe the compression operation of the present invention.

BEST MODES FOR ACHIEVING THE INVENTION

Figure 10:
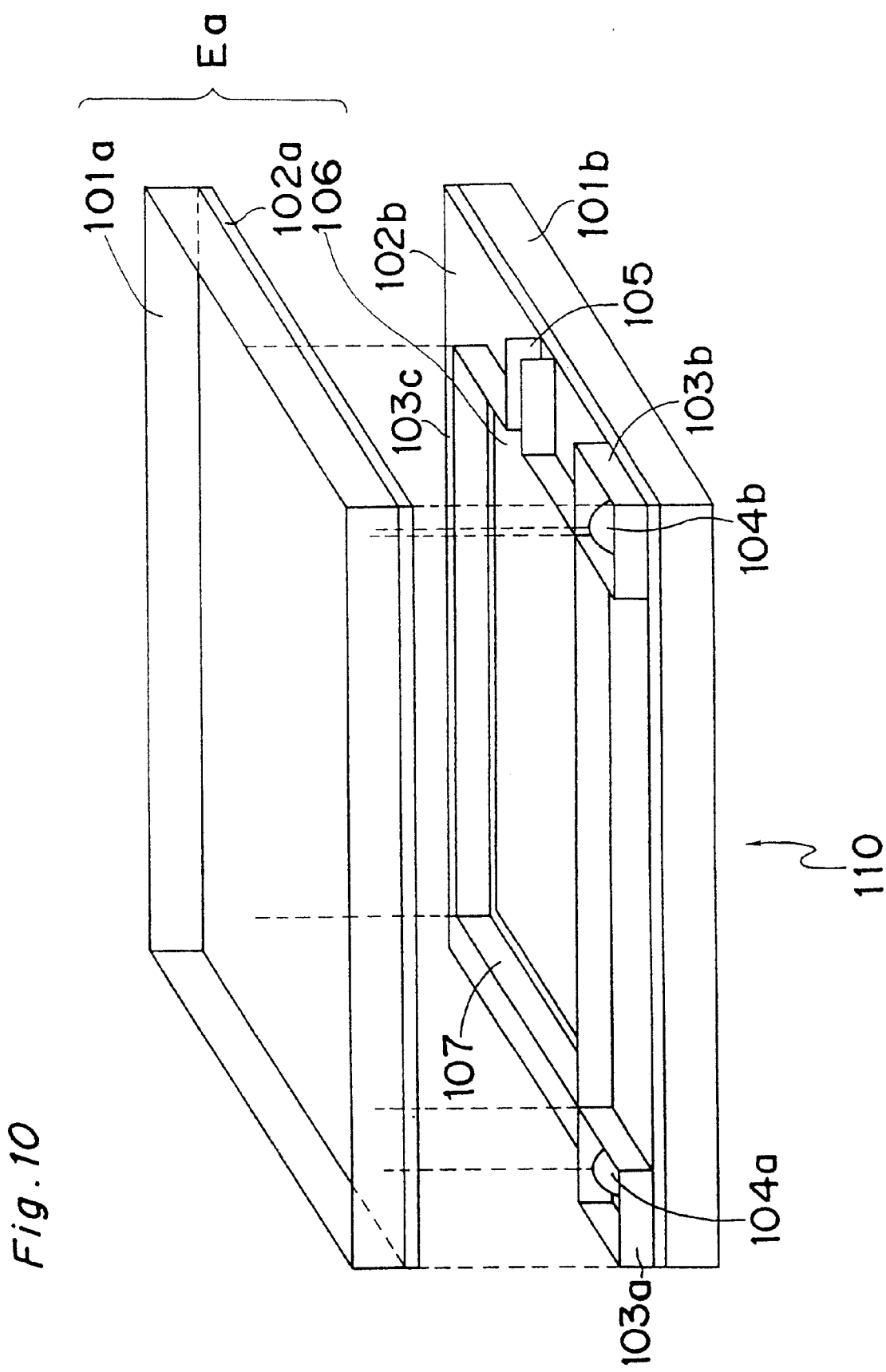
FIG. 10 is a perspective view of a typical configuration of a polymer dispersed LCD element according to a second embodiment of the present invention.

A first embodiment of the present invention for achieving the above-described first object is described below with reference to FIG. 1 through FIG. 8, a second embodiment of the present invention for achieving the above-described second object is described below with reference to FIG. 10 through FIG. 11, and a third embodiment of the present invention for achieving the above-described third object is described below with reference to FIG. 13 through FIG. 22.

Embodiment 1

Figure 1:
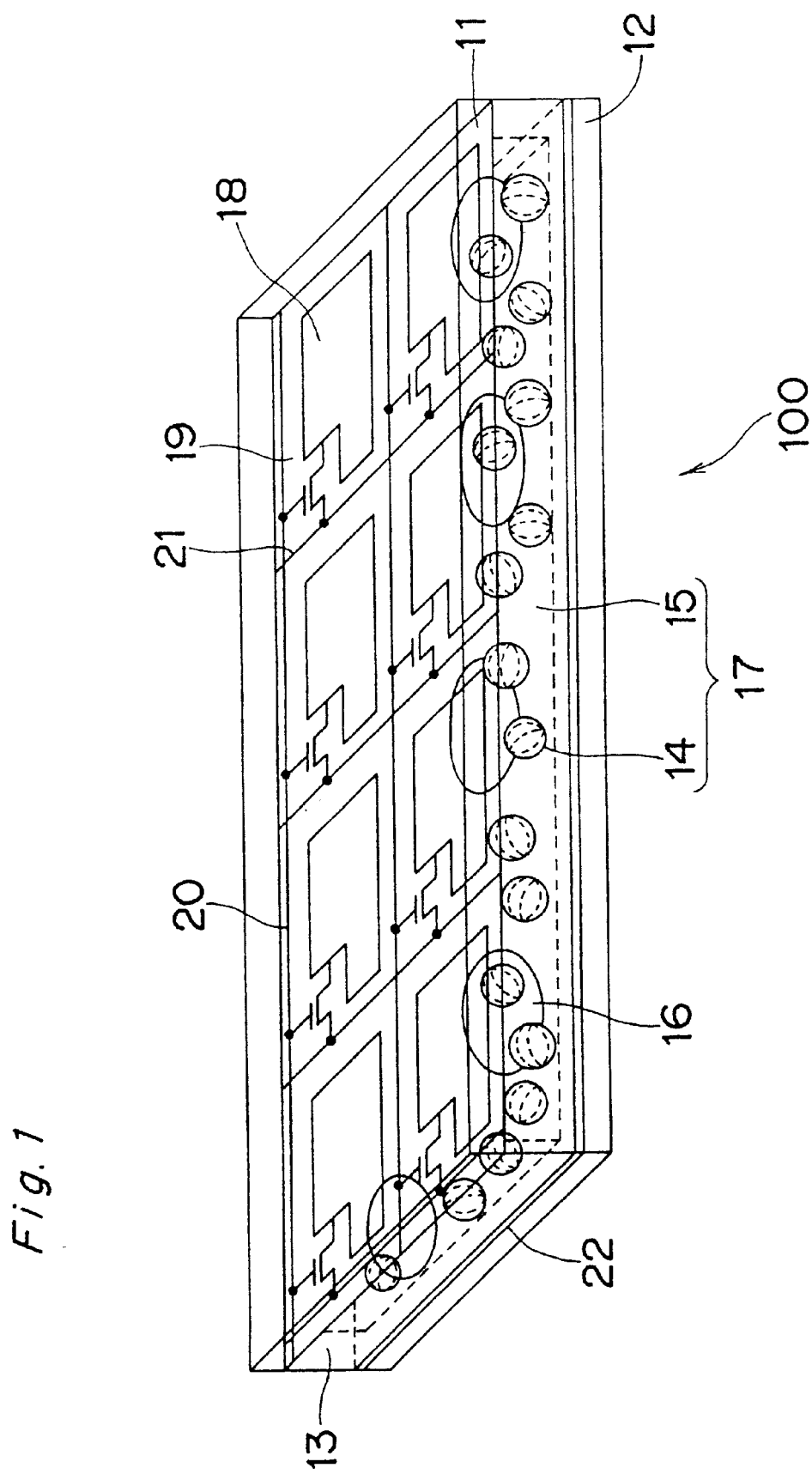
FIG. 1 is a perspective view of a typical configuration of a polymer dispersed LCD element according to a first embodiment of the present invention.

FIG. 1 is a perspective view of a liquid crystal display (LCD) element 100 according to a first embodiment of the present invention for achieving the above-described first object. This LCD element 100 comprises glass plates 11 and 12, seal material 13, liquid crystals 14, polymer matrix 15, spacers 16, transparent electrodes 18 and 22, TFT element 19, gate signal line 20, and source signal line 21.

The glass plates 11 and 12, which are a pair of counter substrates, are both transparent substrates made of glass. The polymer matrix 15 is a polymer compound with a three-dimensional networked structure. The liquid crystals 14 are liquid crystal droplets dispersed in the polymer matrix 15, or are dispersed liquid crystal droplets linked in a networked structure. A liquid crystal layer 17 disposed between glass plates 11 and 12 is formed from the liquid crystals 14 and polymer matrix 15. The volume ratio of liquid crystals 14 and polymer matrix 15 in the liquid crystal layer 17 is approximately 4 to 1.

The seal material 13 is coated to the perimeter of the glass plates 11 and 12, and seals the liquid crystal layer 17. The spacers 16 are spherical beads made from a resilient resin and colored to black or another color with light blocking properties; numerous spacers 16 are distributed through the liquid crystal layer 17. Each of the spacers 16 has an approximately equal particle diameter, and by being resiliently compressed by the glass plates 11 and 12, maintain a constant gap between the two glass plates. The spacers 16 can be coated with, for example, $SiO_2$ to adjust such physical properties as resiliency. Both resin beads and resin beads coated with, for example, $SiO_2$ are referred to below as resin beads.

While polymer dispersed LCD elements normally display black when a voltage is not applied, a light-blocking material is used for the spacers 16 to prevent light leakage through the spacers 16 in this black display.

The transparent electrode 18 is a conductive film of ITO disposed on the glass plate 11, and is segmented into a transparent electrode for each of the pixels of the LCD element 100. The transparent electrode 22 is a conductive film of ITO disposed on glass plate 12; it is a transparent electrode common to all pixels of the LCD element 100.

The TFT (thin-film transistor) element 19 is a TFT element switching means connected to each of the transparent electrodes 18. Gate signal line 20 and source signal line 21 are connected to each of the TFT elements 19.

The transparent electrodes 18, TFT elements 19, gate signal line 20, and source signal line 21 are formed on the liquid crystal layer 17 side on glass plate 11, and transparent electrode 22 is likewise formed on the liquid crystal layer 17 side of the glass plate 12. Transparent electrodes 18 and 22, TFT elements 19, gate signal line 20, and source signal line 21 constitute a voltage application means disposed to the glass plates 11 and 12, that is, the pair of opposing substrates.

A gate signal and source signal output from a drive circuit not shown in the figure are output to the TFT elements 19 of LCD element 100 thus comprised by means of the gate signal line 20 and source signal line 21, respectively. When a TFT element 19 is switched to an on state as a result of the gate signal, the potential of the connected transparent electrode is set to potential corresponding to the source signal. The transparent electrode 22 is set to a specific potential by means of a drive circuit not shown in the figure. As a result, a voltage corresponding to the brightness of each pixel in the image to be displayed is applied to the liquid crystal layer 17, and when light from a backlight not shown in the figure is incident thereon, an image is displayed on the LCD element 100.

Referring to FIG. 2A, FIG. 2B, FIG. 2C, and FIG. 3, the structural change occurring in a LCD element 100 according to the present invention as a result of a sudden temperature change is described below.

Figure 2A:
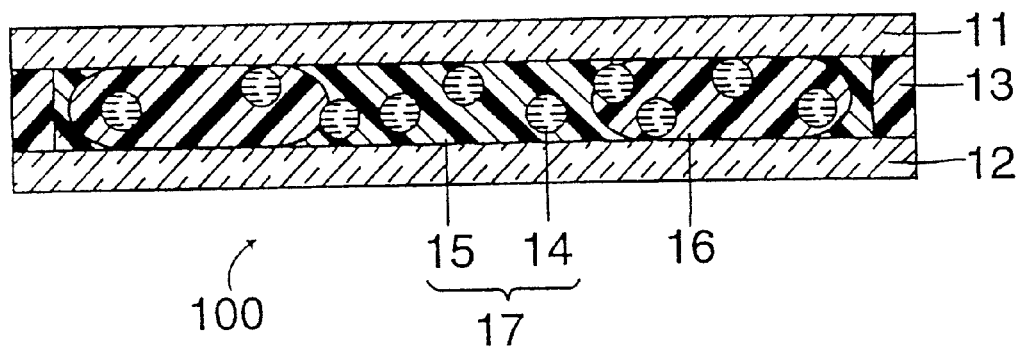
FIG. 2A FIG. 2B, and FIG. 2C are typical section diagrams of a polymer dispersed LCD element shown in FIG. 1 at, respectively, normal temperature, high temperature, and when returned from high temperature to normal temperature.

The condition of the LCD element 100 at normal temperature (which in the present embodiment is 20° C.) is shown first in FIG. 2A. In this condition, pressure equal to the difference between the atmospheric pressure and the pressure of the liquid crystal layer 17 on the glass plates 11 and 12 (referred to below as the "internal pressure" of the liquid crystal layer 17) is applied to the two glass plates from the outside thereof, and spacers 16 are compressed as a result.

Figure 2B:
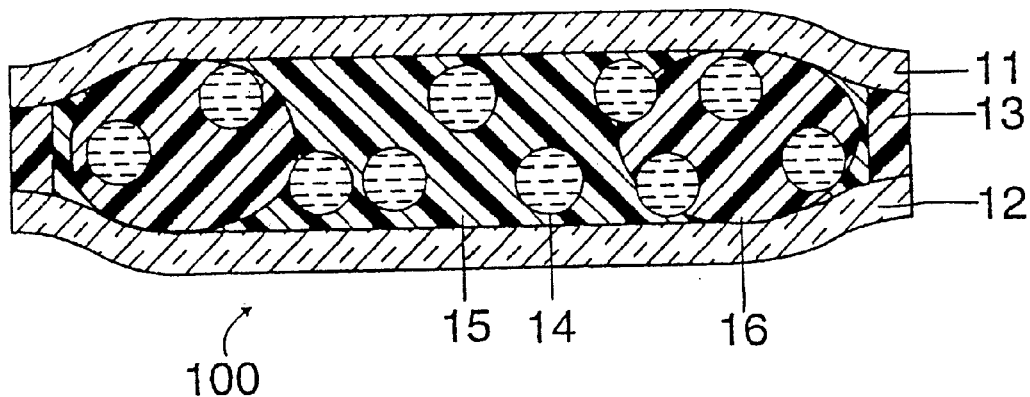

The condition of the LCD element 100 when the temperature of the LCD element 100 at normal temperature in FIG. 2A is raised to a high temperature (which in the present embodiment is 85° C.) is shown in FIG. 2B. In this condition the internal pressure of the liquid crystal layer 17 has risen as a result of heat. The linear expansion coefficient of the spacers 16 in the present embodiment is $$7.0-10.0 \times 10^{-5} (1/K),$$

the linear expansion coefficient of the liquid crystals 14 is $$7.0-10.0 \times 10^{-4} (1/K),$$

and the linear expansion coefficient of the polymer matrix 15 is equal to or less than the expansion coefficient of the spacers 16. The volume ratio of the liquid crystals 14 to the polymer matrix 15 in the liquid crystal layer 17 is also approximately 4 to 1. As a result, expansion of the spacers 16 and the polymer matrix 15 can be substantially ignored, and the heat-induced increase in the internal pressure of the liquid crystal layer 17 is dependent upon expansion of the liquid crystals 14.

Figure 3:
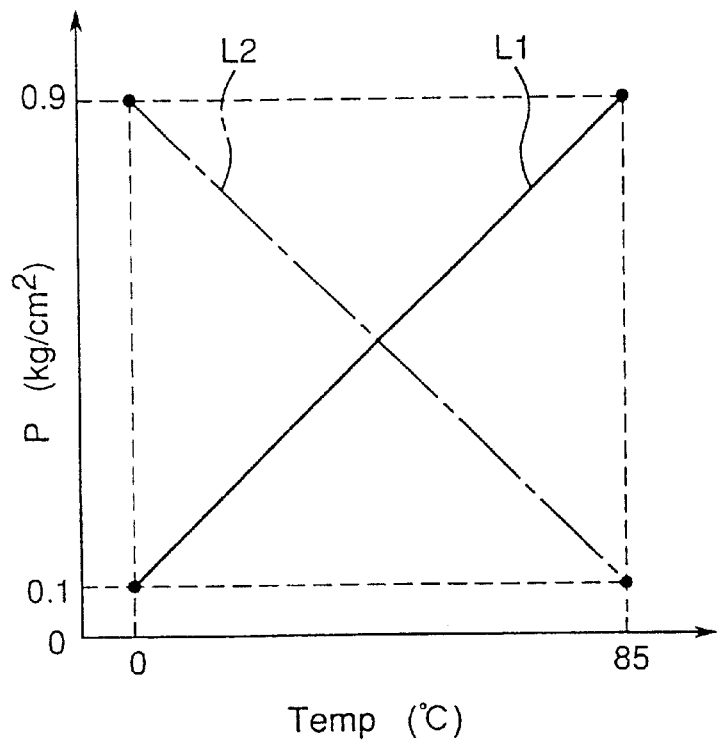
FIG. 3 is a figure showing the relationship between the internal pressure of the liquid crystal layer and spacer repulsion Pr when the temperature of an LCD element under a constant atmospheric pressure is raised and then lowered within a specific temperature range.

One example of the relationship between repulsion Pr of the spacers 16 and the internal pressure Pi of the liquid crystal layer 17 when the temperature LCD element 100 is increased and decreased within a particular temperature range under a constant atmospheric pressure is shown in FIG. 3. Note that the atmospheric pressure in this figure is 1.0 kg/cm². The horizontal axis shows the temperature Temp in a range from 0° C. to 85° C. The vertical axis shows the pressure P in a range from 0.1 kg/cm² to 0.9 kg/cm². Solid line L1 shows the pressure applied to the liquid crystal layer 17, that is, the internal pressure Pi of the liquid crystal layer 17; dot-dash line L2 shows the pressure applied to the spacers 16, that is, the repulsion Pr of spacers 16 per unit area. Note that the repulsion of the spacers 16 per unit area is below referred to as simply the repulsion Pr of the spacers 16.

In the above temperature range, both the internal pressure of the liquid crystal layer 17 and the repulsion Pr of spacers 16 are present, and the sum thereof is equal to the atmospheric pressure. That is, the LCD element 100 counters the atmospheric pressure by means of the internal pressure of the liquid crystal layer 17 and the repulsion Pr of the spacers 16.

When the internal pressure of the liquid crystal layer 17 rises proportionally to the rise in temperature, the repulsion Pr of the spacers 16 decreases, but repulsion Pr is always present in the spacers 16 within the temperature range of the present embodiment (0° C. to 85° C.). That is, the compressed spacers 16 push up on the glass plates 11 and 12 from the inside thereof at all points throughout the liquid crystal layer 17 with repulsion Pr, and are held in the compressed condition. As a result, the gap width is uniformly distributed at all points other than the perimeter area secured by the seal material 13 as shown in FIG. 2B.

Figure 2C:
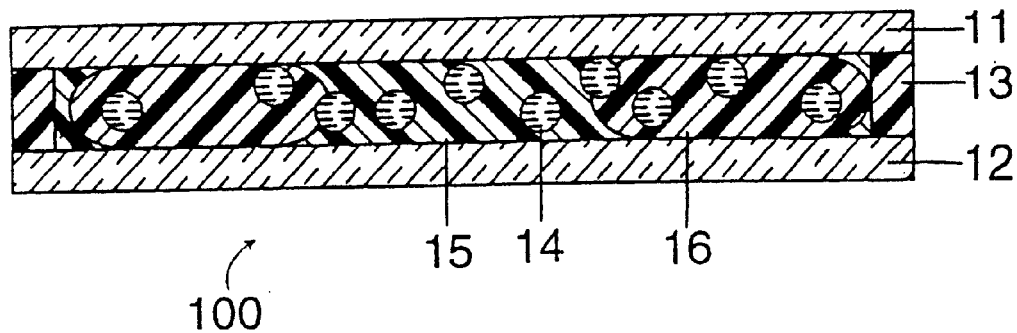

The condition when the temperature of the LCD element 100 is dropped rapidly to normal temperature from the high temperature state shown in FIG. 2B is shown in FIG. 2C. When a LCD element 100 in a high temperature state as shown in FIG. 2B is cooled, the internal pressure of the liquid crystal layer 17 decreases and the repulsion Pr of the spacers 16 increases. In other words, the expanded liquid crystal layer 17 contracts while the glass plates 11 and 12 and spacers 16 remain in constant contact. As a result, the liquid crystal layer 17 contracts uniformly throughout without differences in contraction appearing at different locations. As a result, the original condition (FIG. 2A) is completely restored as shown in FIG. 2C even when the temperature drops rapidly from a high temperature state to normal temperature.

In addition, when the temperature of the LCD element 100 is reduced to a low temperature (which in the present embodiment is 0° C.), the thickness Tc of the liquid crystal layer 17 decreases, but even in this case the thickness Tc of the liquid crystal layer 17 is held constant by the repulsion Pr of spacers 16 as shown in FIG. 3. It should be noted that internal pressure is present in the liquid crystal layer 17 even at a low temperature, and the LCD element 100 resists atmospheric pressure by means of the internal pressure of the liquid crystal layer 17 and the repulsion Pr of the spacers 16.

As described above, distortion of the gap width between the two glass plates, that is, variation in the thickness Tc of the liquid crystal layer, as a result of temperature variations can be prevented to the extent that spacers 16 are resiliently compressed.

The LCD element 100 has also been described in the present embodiment as a transparent liquid crystal display element that is a pair of substrates comprising voltage application means where both substrates are transparent glass panels comprising a transparent electrode. In addition to the above-described mode of the present embodiment, however, a reflecting liquid crystal display element having the benefits of the present invention can be achieved by using, for example, a reflective electrode for reflecting light in place of transparent electrode 22.

One conceivable means of building a reflective LCD element is to provide a reflective electrode segmented for each pixel in place of transparent electrode 18, and supply a voltage from the TFT element 19 to each of the reflective electrodes.

The present embodiment has also been described as a configuration using a TFT element as a switching means, but it will be obvious that an active element having the same function, for example, a MIM (metal-insulator-metal) element, can be used in place of a TFT element.

Yet further, the temperature range has been stated in the above description as being from 0° C. to 85° C., but the effect of the present invention can be achieved insofar as internal pressure in the liquid crystal layer 17 and repulsion Pr in the spacers 16 are present, and the sum of these is equal to the atmospheric pressure, and the present invention shall not be limited to the above temperature range.

A projection apparatus using a liquid crystal display element that is a first embodiment of the present invention for achieving the above first object of the invention is described next below with reference to FIG. 4. A projection apparatus 150a according to the present embodiment of the invention comprises a light source 30, a screen 33, color filter 31, projection lens 32 as the projection means, and the LCD element 100 according to the above-described first embodiment, each arranged as shown in the figure. The LCD element 100 and color filter 31 constitute a light transmission unit Lcu.

In the figure, the LCD element 100 generates a gradation image using white light emitted by the light source 30 according to a signal from an externally disposed drive circuit (not shown in the figure). In this sense, the LCD element 100 constitutes a density control unit Dcu. This gradation image is converted to a color image as it passes the color filter 31. The color image from the color filter 31 is then projection enlarged to the screen 33 by the projection lens 32.

A projection apparatus 150a according to the present embodiment can thus enlarge and project a color image to a screen 33 using a LCD element 100. It should be noted that the color filter 31 is shown by way of example in FIG. 4 as being interposed between the LCD element 100 and projection lens 32, but color filter 31 can be alternatively placed between the light source 30 and LCD element 100.

An alternative configuration of the above-described projection apparatus 150a is described below with reference to FIG. 5. In the present example, the projection apparatus 150b comprises three LCD elements 100R, 100G, and 100B, each configured identically to the LCD element 100 according to the first embodiment of the present invention as in projection apparatus 150a. In addition, this projection apparatus 150b comprises a light source 30, screen 33, dichroic mirrors 34a, 34b, 34c, and 34d, and mirrors 35a and 35b, arranged as shown in the figure.

Dichroic mirrors 34a and 34b, and mirror 35a, constitute a color separation unit Csu, and the color separation unit Csu and density control unit Dcu' formed by LCD elements 100, 100G, and 100B together constitute a light transmission unit Lcu'. In addition, mirror 35b and dichroic mirrors 34c and 34d constitute a color mixing unit Cmu, and the color mixing unit Cmu and projection lens 32 constitute a projection unit Pu.

The dichroic mirror 34a that is part of the color separation unit Csu passes the green (G) and blue (B) components of the white light from the light source 30, and reflects the red (R) component. Dichroic mirror 34b passes only the blue (B) component of the G and B components passed by dichroic mirror 34a, and reflects the G component. Mirror 35a reflects the B component passed by dichroic mirror 34b.

As a result, the R, G, and B primary color light separated by the color separation unit Csu is respectively incident on the LCD elements 100R, 100G, and 100B forming the density control unit Dcu'. The LCD elements 100R, 100G, and 100B then generate respective R, G, and B gradation images according to signals from a drive circuit disposed externally thereto.

The mirror 35b that is part of the color mixing unit Cmu reflects the R gradation image from the LCD element 100R. Dichroic mirror 34c reflects the G gradation image from the LCD element 100G, and passes the R gradation image from the mirror 35b. Dichroic mirror 34d reflects the B gradation image from LCD element 100B, and passes the R and G gradation images from dichroic mirror 34d.

As a result, the R, G, and B gradation images are mixed, and a color image is produced. The produced color image is projection enlarged to the screen 33 by projection lens 32.

As described above, a projection apparatus 150b according to the present invention uses three liquid crystal display elements having the same configuration as the LCD element 100 according to the above first embodiment of the invention to project and enlarge a color image to a screen 33.

It should be noted that a projection lens for R, G, and B, respectively, can be provided in place of the color mixing unit Cmu in the present mode of the invention so that separate R, G, and B gradation images are enlarged and projected to the same position on the screen 33, and the separate R, G, and B gradation images are thereby mixed on screen.

Referring again to FIG. 2A, various version of a LCD element 100 according to the present invention are described in detail below.

EXAMPLE 1

Resin beads with an average particle diameter of 8.98 $\mu$m and standard deviation of 0.34 $\mu$m are used for the spacers 16 distributed in the liquid crystal layer 17. The distribution density is approximately 10/mm$^2$ to 300/mm$^2$.

A composite material of a liquid crystal material and a material (called a prepolymer below) that becomes the polymer compound (polymer matrix) is filled between the glass plates 11 and 12 from a discontinuity in the seal material 13 by a vacuum injection method, and then while applying pressure to achieve an internal pressure of 0.35 kg/cm$^2$ in the liquid crystal layer 17, a seal resin that will become part of the seal material 13 is coated to the discontinuity in the seal material 13.

Next, by irradiating the filled composite of a liquid crystal material and the prepolymer with ultraviolet light at a 50 mW/cm$^2$ intensity, the prepolymer is polymerized while at the same time the liquid crystal material and polymer compound are phase separated, thereby obtaining a liquid crystal layer 17 comprising liquid crystals 14 and polymer matrix 15. In the present version the thickness Tc of the liquid crystal layer 17 is 8.58 $\mu$m.

When an image was displayed on a LCD element 100 thus comprised, display blemishes were not observed at normal temperature (20° C.) or after heating once to a high temperature (85° C.) and then cooling to normal temperature.

Display blemishes were also substantially not observed even at a high temperature because the thickness Tc of the liquid crystal layer 17 is substantially uniform. When tested using various types of distributed spacers 16, it was found that resin beads are the most effective.

Figure 6:
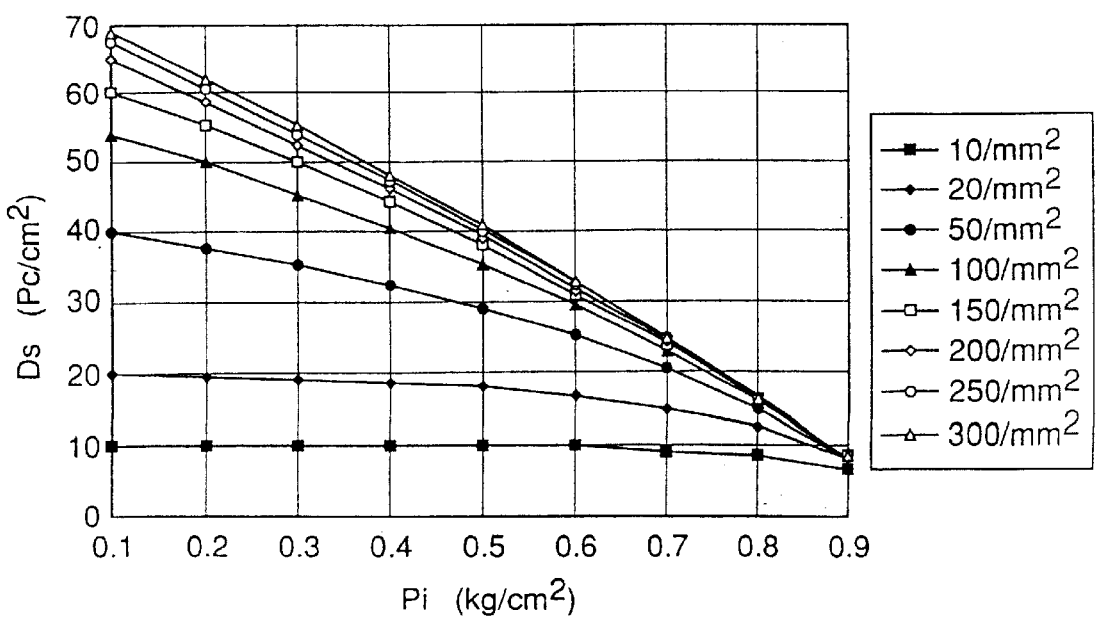
FIG. 6 is a figure showing the relationship between the internal pressure of a liquid crystal layer and the distribution density of compressed spacers in a LCD element.

The distribution density N (pcs/mm$^2$) of the spacers 16 and the internal pressure Pi (kg/cm$^2$) of the liquid crystal layer 17 in the present version are described next with reference to FIG. 6. FIG. 6 shows the internal pressure Pi (kg/cm$^2$) of the liquid crystal layer 17 on the horizontal axis, and the density Ds (pcs/mm$^3$) of the compressed spacers 16 on the vertical axis, for distribution density N of 10/mm$^2$ (-■-), 20/mm$^2$ (-♦-), 50/mm$^2$ (-●-), 100/mm$^2$ (-▲-), 150/mm$^2$ (-□-), 200/mm$^2$ (-○-), 250/mm$^2$ (-○-), and 300/mm$^2$ (-△-). From FIG. 6 it is known that an internal pressure Pi of a maximum 0.9 kg/cm$^2$ is sufficient in the present invention because variation in the dimensional change of the liquid crystal layer 17 as a result of heating and cooling can be absorbed when the density of compressed spacers 16 is approximately 10/mm$^2$.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. In tests conducted with a LCD element 100 manufactured as actually described above, display blemishes were substantially not confirmed even when an image was displayed on the LCD element 100 in a low temperature condition.

The conditions relating to the internal pressure Pi (kg/cm$^2$) of the liquid crystal layer 17 and the distribution density N (pcs/mm$^2$) of the spacers 16 in a defined temperature range (for example, from 0° C. to 85° C.) as described above can be expressed by the following equations (1) and (2).

$$Pi \leq 0.9 \quad (1)$$

$$10 \leq N \leq 300 \quad (2)$$

More preferably, the density Ds of the compressed spacers 16 is 20 pcs/mm$^2$ or greater. In this case, it is sufficient to set the internal pressure Pi to 0.7 kg/cm$^2$ or less.

EXAMPLE 2

Except for the internal pressure P of the liquid crystal layer 17 being 0.3 kg/cm2 or less in the present version, the same materials and methods as in the first version are used to form a LCD element 100 wherein the thickness Tc of the liquid crystal layer 17 is 8.57 μm. In tests conducted with a LCD element 100 actually manufactured according to the present version, the following results were obtained.

When a LCD element 100 according to the present version was heated to 85° C., the thickness Tc of the liquid crystal layer 17 became 8.98 μm, the same as the average particle diameter Dav of the distributed spacers 16, due to expansion of the liquid crystals 14 and polymer matrix 15. The internal pressure Pi of the liquid crystal layer 17 at this time was 0.82 kg/cm$^2$. As in the case of the first version above, when an image was displayed on the LCD element 100, display blemishes were not observed at normal temperature (20° C.) or after heating once to a high temperature (85° C.) and then cooling to normal temperature. Display blemishes were also substantially not observed even at a high temperature because the thickness Tc of the liquid crystal layer 17 is substantially uniform.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. Therefore, display blemishes were substantially not confirmed even when an image was displayed on the LCD element 100 in a low temperature condition.

Figure 7:
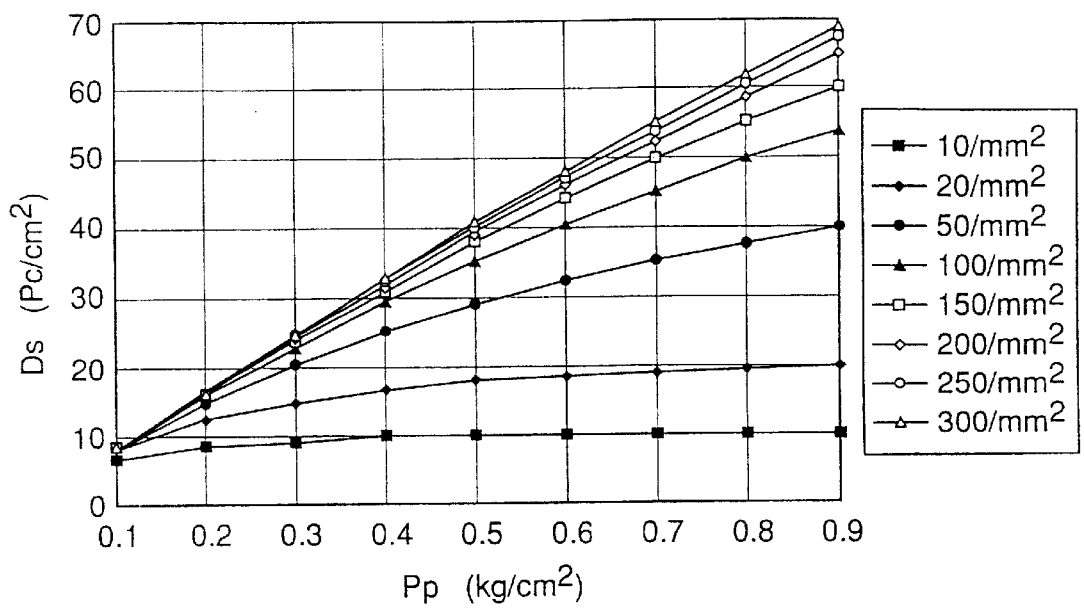
FIG. 7 is a figure showing the relationship between the applied sealing pressure and the distribution density of compressed space LCD element.

The relationship between distribution density Ds of the compressed spacers and pressing pressure Pp during sealing of the LCD element 100 is shown in FIG. 7. In FIG. 7 as in FIG. 6, the density Ds (pcs/mm$^3$) of the compressed spacers 16 is shown on the horizontal axis, but the internal pressure Pp (kg/cm$^2$) of the liquid crystal layer 17 is shown on the vertical axis, for the same distribution density N of 10/mm$^2$ (-■-), 20/mm$^2$ (-♦-), 50/mm$^2$ (-●-), 100/mm$^2$ (-▲-) 150/mm$^2$ (-□-), 200/mm$^2$ (-○-), 250/mm$^2$ (-○-), and 300/mm$^2$ (-△-).

As described above, the thickness Tc of the liquid crystal layer 17 at the upper temperature limit is substantially equal to the average particle diameter Dav of the spacers 16. Moreover, as can be clearly observed from FIG. 7, if the internal pressure Pi of the liquid crystal layer 17 at the upper temperature limit if the internal pressure Pi in a specific temperature range (for example, from 0° C. to 85° C.) is 0.82 kg/cm$^2$ (=Pi1) or less so that the density Ds of the compressed spacers 16 is 10 pcs/mm$^2$ or greater, no variation in display quality is observed.

EXAMPLE 3

A LCD element 100 with a liquid crystal layer 17 thickness Tc of 8.24 μm was formed in the present version using the same materials and method used in the first version. When the LCD element 100 of the present version was heated to 85° C., the thickness Tc of the liquid crystal layer 17 became 8.64 μm, that is, the same as the difference Dav-σ of the average particle diameter Dav (=8.98 μm) of the distributed spacers 16 and the standard deviation a (0.34 μm) of the particle diameter D of the spacers 16, due to expansion of the liquid crystals 14 and the polymer matrix 15. The internal pressure Pi of the liquid crystal layer 17 at this time was 0.65 kg/cm$^2$ (=Pi2).

As in the first and second versions, when an image was displayed on the LCD element 100 of the present version, display blemishes were not observed at normal temperature (20° C.) or after heating once to a high temperature (85° C.) and then cooling to normal temperature. Display blemishes were also substantially not observed even at a high temperature because the thickness Tc of the liquid crystal layer 17 is substantially uniform.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. Therefore, display blemishes were substantially not confirmed even when an image was displayed on the LCD element 100 in a low temperature condition.

As described above, if the thickness Tc of the liquid crystal layer 17 at the upper temperature limit is substantially equal to the difference Dav-σ of the average particle diameter Dav and the standard deviation σ of the spacers 16, and the internal pressure Pi of the liquid crystal layer 17 at that temperature is 0.65 kg/cm² (=Pi2) or less, no variation in display quality is observed.

EXAMPLE 4

A LCD element 100 with a liquid crystal layer 17 thickness Tc of 7.92 μm was formed in the present version using the same materials and method used in the first version.

When the LCD element 100 of the present version was heated to 85° C., the thickness Tc of the liquid crystal layer 17 became 8.30 μm, that is, the same as the difference Dav-2σ of the average particle diameter Dav (=8.98 μm) of the distributed spacers 16 and twice the standard deviation σ (0.34 μm) of the particle diameter D of the spacers 16, due to expansion of the liquid crystals 14 and the polymer matrix 15. The internal pressure Pi of the liquid crystal layer 17 at this time was 0.49 kg/cm² (=Pi3).

As in the first to third versions, when an image was displayed on the LCD element 100 of the present version, display blemishes were not observed at normal temperature (20° C.) or after heating once to a high temperature (85° C.) and then cooling to normal temperature. Display blemishes were also substantially not observed even at a high temperature because the thickness Tc of the liquid crystal layer 17 is substantially uniform.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. Therefore, display blemishes were substantially not confirmed even when an image was displayed on the LCD element 100 in a low temperature condition.

As described above, if the thickness Tc of the liquid crystal layer 17 at the upper temperature limit is substantially equal to the difference Dav-2σ of the average particle diameter Dav and twice the standard deviation σ of the spacers 16, and the internal pressure Pi of the liquid crystal layer 17 at that temperature is 0.49 kg/cm² (Pi3) or less, no variation in display quality is observed.

EXAMPLE 5

A LCD element 100 with a liquid crystal layer 17 thickness Tc of 7.92 μm when the internal pressure of the liquid crystal layer 17 is 0.3 kg/cm² was formed in the present version using the same materials and method used in the first version. When the LCD element 100 of the present version was heated to 85° C., the thickness Tc of the liquid crystal layer 17 changed by 0.40 μm to be 8.98 μm, equal to the average particle diameter Dav, due to expansion of the liquid crystal material. At this time, the internal pressure of the liquid crystal was 0.56 kg/cm².

The variation ΔTc (μm) in thickness Tc of the liquid crystal layer 17 due to temperature change can be expressed by the following equation (3)

$$\Delta Tc = \alpha \cdot \Delta \theta \cdot Tc0 \quad (3)$$

where α (1/K) is the expansion coefficient of the liquid crystal material, Δt (K) is a temperature range, and Tc0 (μm) is the thickness Tc of the liquid crystal layer 17 at 0° C.

Therefore, α in the present version is $7.0 \times 10^{-4}$ because temperature range Δt is 65° C. range from 20° C. to 85° C.

As in the first, second, third, and fourth versions, when an image was displayed on the LCD element 100 of the present version, display blemishes were not observed at normal temperature (20° C.) or after heating once to a high temperature (85° C.) and then cooling to normal temperature. Display blemishes were also substantially not observed even at a high temperature because the thickness Tc of the liquid crystal layer 17 is substantially uniform.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. Therefore, display blemishes were substantially not confirmed even when an image was displayed on the LCD element 100 in a low temperature condition.

In the case of the present version, the variation in the thickness Tc of the liquid crystal layer 17 is preferably ±0.21 μm, that is, within ±2.5% of the average of thickness Tc. The reasons for this are described below. If V90 is the applied voltage required to achieve 90% transmissivity relative to the saturated transmissivity, that is, the maximum transmissivity, of the liquid crystal display element, V90 was 8.2 V in the LCD element 100 formed using the above-noted materials and method.

Figure 8:
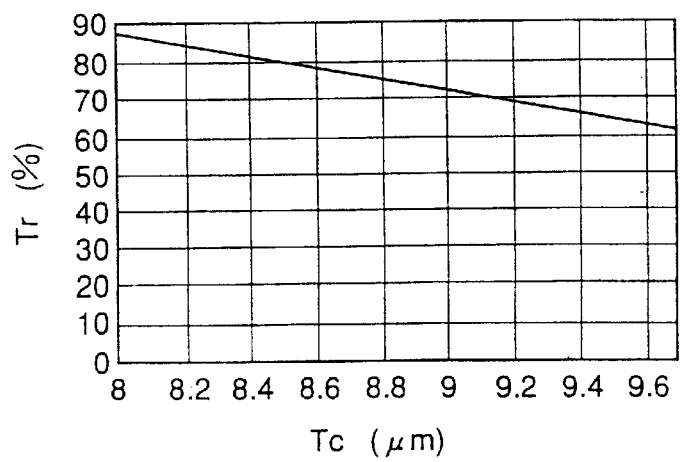
FIG. 8 is a figure showing the relationship between transmittance and liquid crystal layer thickness when a voltage of 8.2 V is applied.
Figure 9A:
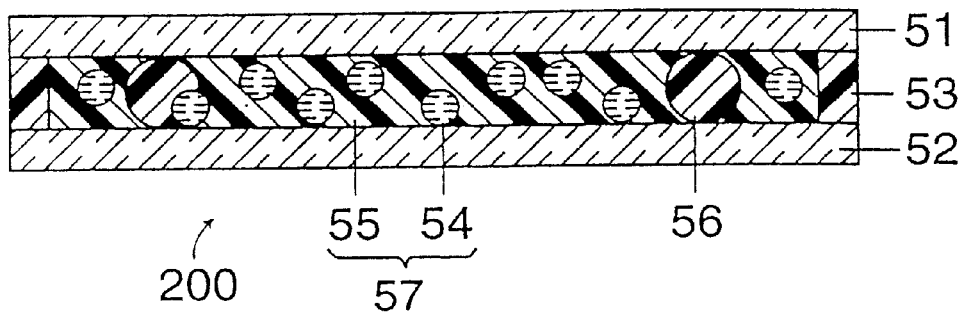
FIG. 9A, FIG. 9B, and FIG. 9C are typical section diagrams of a conventional polymer dispersed LCD element 200 at, respectively, normal temperature, high temperature, and when returned from high temperature to normal temperature.
Figure 9B:
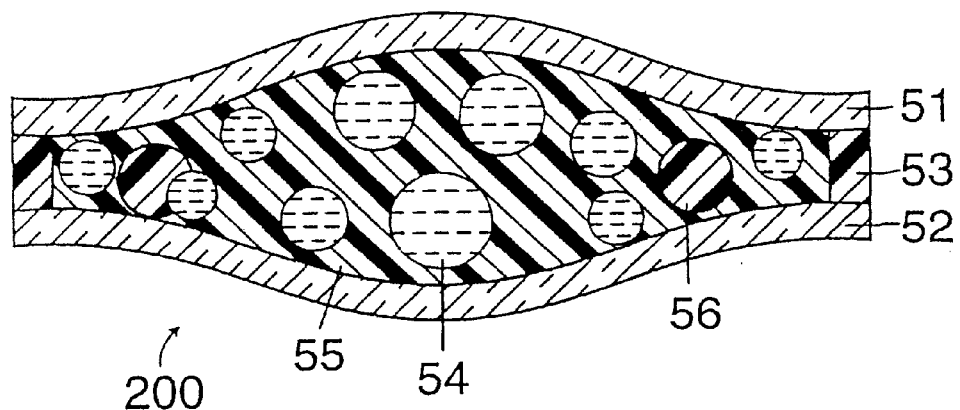
Figure 9C:
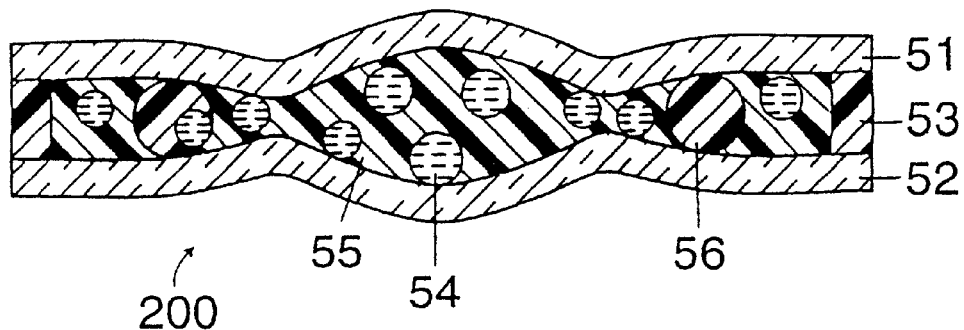

FIG. 8 shows the relationship between thickness Tc of the liquid crystal layer 17 and transmissivity Tr when a voltage of 8.2 V was applied to various LCD elements 100 prepared using the method described in the present version and using spacers 16 of various average particle diameters Dav. If ΔTr is the variation in transmissivity Tr at a thickness Tc of the liquid crystal layer 17, experience has shown that there are no problems in practical use with a ΔTr of ±8%. From FIG. 8 it is known that the tolerance range for variation in the thickness Tc is 8.55±0.21 μm when the thickness Tc of the liquid crystal layer 17 is 8.58 μm. That is, the tolerance range for variation ΔTc in thickness Tc of the liquid crystal layer 17 is within ±2.5% of the thickness Tc.

As described above, no variation in display quality is observed within a specific temperature range ΔT (for example, from 0° C. to 85° C.) if equations 4 and 5

$$\Delta Tc/Tc \leq 0.025 \quad (4)$$

$$Tc + \Delta Tc \leq Dav \quad (5)$$

are satisfied between the thickness Tc of the liquid crystal layer 17, variation ΔTc in the thickness Tc of the liquid crystal layer 17, and the average particle diameter Dav of the spacers.

EXAMPLE 6

A LCD element 100 with a liquid crystal layer 17 thickness Tc of 8.24 μm when the internal pressure of the liquid crystal layer 17 is 0.23 kg/cm² was formed in the present version using the same materials and method used in the first version. As in the fifth version, the variation ΔTc in the thickness is preferably within ±2.5% of the average of thickness Tc, that is, thickness Tc is preferably 8.24±0.21 μm, in the present version.

When the LCD element 100 of the present version was heated to 85° C., the thickness Tc of the liquid crystal layer 17 increased by 0.40 μm to be 8.64 μm, that is, the same as the difference Dav-σ of the average particle diameter Dav (=8.98 μm) of the spacers 16 and the standard deviation σ (0.34 μm) of the particle diameter D of the spacers 16, due to expansion of the liquid crystals 14 and the polymer matrix 15. The internal pressure Pi of the liquid crystal layer 17 at this time was 0.65 kg/cm$^2$.

As in the first, second, third, fourth and fifth versions, when an image was displayed on the LCD element 100 of the present version, display blemishes were not observed at normal temperature (20° C.) or after heating once to a high temperature (85° C.) and then cooling to normal temperature. Display blemishes were also substantially not observed even at a high temperature because the thickness Tc of the liquid crystal layer 17 is substantially uniform.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. Therefore, display blemishes were substantially not confirmed even when an image was displayed on the LCD element 100 in a low temperature condition.

As described above, no variation in display quality is observed within a specific temperature range Δt (for example, from 0° C. to 85° C.) if equations 4 and 6

$$\Delta Tc/Tc \leq 0.025 \tag{4}$$

$$Tc + \Delta Tc \leq Dav - \sigma \tag{6}$$

are satisfied between the thickness Tc of the liquid crystal layer 17, variation ΔTc in the thickness Tc of the liquid crystal layer 17, and the average particle diameter Dav of the spacers.

EXAMPLE 7

A LCD element 100 with a liquid crystal layer 17 thickness Tc of 7.92 μm was formed in the present version using the same materials and method used in the first version. As in the fifth and sixth versions, the variation ΔTc in the thickness is preferably within ±2.5% of the average of thickness Tc, that is, thickness Tc is preferably 7.92±0.20 μm, in the present version.

When the LCD element 100 of the present version was heated to 85° C., the thickness Tc of the liquid crystal layer 17 increased 0.40 μm to 8.30 μm, that is, the same as the difference Dav-2σ of the average particle diameter Dav (=8.98 μm) of the spacers 16 and twice the standard deviation σ (0.34 μm) of the particle diameter D of the spacers 16, due to expansion of the liquid crystals 14 and the polymer matrix 15. The internal pressure Pi of the liquid crystal layer 17 at this time was 0.49 kg/cm$^2$.

As in the first, second, third, fourth, fifth and sixth versions, when an image was displayed on the LCD element 100 of the present version, display blemishes were not observed at normal temperature (20° C.) or after heating once to a high temperature (85° C.) and then cooling to normal temperature. Display blemishes were also substantially not observed even at a high temperature because the thickness Tc of the liquid crystal layer 17 is substantially uniform.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. Therefore, display blemishes were substantially not confirmed even when an image was displayed on the LCD element 100 in a low temperature condition.

As described above, no variation in display quality is observed within a specific temperature range Δt (for example, from 0° C. to 85° C.) if equations 4 and 7

$$\Delta Tc/Tc \leq 0.025 \tag{4}$$

$$Tc + \Delta Tc \leq Dav - 2\sigma \tag{7}$$

are satisfied between the thickness Tc of the liquid crystal layer 17, variation ΔTc in the thickness of the liquid crystal layer 17, and the average particle diameter Dav of the spacers.

EXAMPLE 8

In the present version, a LCD element 100 according to the first version was prepared, and a composite material comprising the same liquid crystal material and prepolymer used in the first version was filled from the discontinuity in the seal material 13 using a vacuum injection method. After filling this composite material, the discontinuity in the seal material 13 was coated with a seal resin while an external pressure Pp of 0.9 kg/cm$^2$ pressing inward on the glass substrates was applied. This seal resin was also the same as that used in the first version.

Next, by irradiating the composite material in the LCD element 100 with ultraviolet light at a 50 mW/cm$^2$ intensity, the prepolymer is polymerized while at the same time the liquid crystal material and polymer compound are phase separated, thereby obtaining a liquid crystal layer 17 comprising liquid crystals 14 and polymer matrix 15.

As in the first, second, third, fourth, fifth, sixth and seventh versions, when an image was displayed on the LCD element 100 of the present version, display blemishes were not observed at normal temperature (20° C.) or after heating once to a high temperature (85° C.) and then cooling to normal temperature. Display blemishes were also substantially not observed even at a high temperature because the thickness Tc of the liquid crystal layer 17 is substantially uniform.

The distribution density N (pcs/mm$^2$) of the spacers 16 in the present version, and the externally applied pressure Pp (kg/cm$^2$), which is the atmospheric pressure minus the internal pressure of the liquid crystal layer 17, are described below. In the present version, if the density Ds of the compressed spacers 16 is approximately 10 pcs/mm$^2$, the effect of the spacers 16 is obtained, and from FIG. 7 it is therefore known that it is sufficient to set the pressing pressure Pp to 0.1 kg/cm$^2$ or greater.

Furthermore, when the LCD element 100 is cooled from normal temperature to a low temperature (0° C. in the present embodiment), the liquid crystal layer 17 contracts and internal pressure Pi decreases. In this case, too, as shown in FIG. 3, the LCD element 100 resists atmospheric pressure by means of the internal pressure of the liquid crystal layer 17 and the repulsion Pr of spacers 16. Therefore, display blemishes were substantially not confirmed even when an image was displayed on the LCD element 100 in a low temperature condition.

Therefore, the conditions relating to the external pressure Pp (kg/cm$^2$) and the distribution density N (pcs/mm$^2$) of the spacers 16 in a defined temperature range Δt (for example, from 0° C. to 85° C.) as described above can be expressed by the following equations 8 and 9.

$$0.1 \leq Pp \tag{8}$$

$$10 \leq N \leq 300 \tag{9}$$

Even more preferably, the density Ds of the compressed spacers 16 is 20 pcs/mm² or greater. In this case, it is sufficient to set the external pressure Pp to 0.3 kg/cm² or greater.

It should be noted that while the present invention has been described in detail above with reference to various versions in which the liquid crystal and polymer matrix in the polymer dispersed liquid crystal display element is an NCAP (nematic curvilinear aligned phase) type in which liquid crystal droplets are dispersed in a polymer matrix, the various versions can also be achieved by using a polymer network (PN) type in which the polymer compound in the liquid crystals forming contiguous layers is dispersed in a three-dimensional network pattern or as microdroplets.

Furthermore, while the spacers 16 in the above-described versions have an 8.98 μm average particle diameter with a 0.34 μm standard deviation, the same effects can be achieved even using spacers of other materials, shapes, and sizes insofar as specific conditions relating to the spacers when compressed at high temperature are met.

In addition, the composite material of a prepolymer and liquid crystal material is filled inside the liquid crystal display element using a vacuum injection method in the preceding versions, the same effects can be achieved even when the composite material of a prepolymer and liquid crystal material is filled inside the liquid crystal display element at normal pressure.

It is therefore possible as described above to prevent distortion of the gap width between two glass plates, that is, variation in the thickness of the liquid crystal layer, as a result of a change in temperature, and thereby improve the uniformity of displayed images, with a liquid crystal display element according to the first embodiment of the present invention because spacers distributed therein at a specific density are compressed within the temperature range in which the liquid crystal display element is used. It is also possible by means of a projection apparatus according to the present invention to projection enlarge a uniform image in said temperature range.

Embodiment 2

The configuration of a liquid crystal display element according to a second embodiment of the present invention for achieving the above second object is described below with reference to FIG. 10. The LCD element 110 comprises glass plates 101a and 101b, transparent electrodes 102a and 102b, sealing material 310c, sealing material 103a and 103b, conductive material 104a and 104b, opening 105, active element formation unit 106, and liquid crystal layer 107.

Glass plates 111 and 112, which are a pair of counter substrates, are both transparent substrates made of glass. The sealing material 103c is formed near the perimeter of glass plates 101a and 101b. The opening 105 is a discontinuity provided in the sealing material 103c for filling liquid crystals 114 (not shown in the figure) to the liquid crystal layer 107. TN (twisted nematic) liquid crystals 114 are injected from the opening 105 to the liquid crystal layer 107. It should be noted that a plurality of openings 105 can be provided.

The transparent electrode 102a is a conductive film of ITO disposed on the glass plate 101a, and is a transparent electrode common to all pixels of the LCD element 110. The transparent electrode 102b is a conductive film of ITO disposed on glass plate 101b. For the area enclosed within the sealing material 103c, and transparent electrode 102b is a transparent electrode segmented for each of the pixels of the LCD element 110.

The active element formation unit 106 is an area on the transparent electrode 102b in which TFT elements are formed for each of the pixels of the LCD element 110. Each TFT element in the active element formation unit 106 is connected to a transparent electrode 102b, and functions as a switching means for supplying from a drive circuit not shown in the figure a signal to be supplied to a respective transparent electrode 102b. Elements performing the same switching function, for example, a MIM (metal-insulator-metal) element, can be used in place of these TFT elements.

The conductive materials 104a and 104b are a conductive paste coated to the glass plate 101b. The perimeter areas of the transparent electrodes 102a and 102b are electrically connected. The sealing material 103a and 103b is a protective material formed on the transparent electrode 102b surrounding conductive material 104a and 104b, respectively. That is, the conductive material 104a is sealed by transparent electrodes 102a and 102b and sealing material 103a, and conductive material 104b is sealed by transparent electrodes 102a and 102b and sealing material 103b. The transparent electrodes 102a and 102b and active element formation unit 106 constitute a voltage application means Ea for applying a voltage to the liquid crystals in the liquid crystal layer 107.

Figure 4:
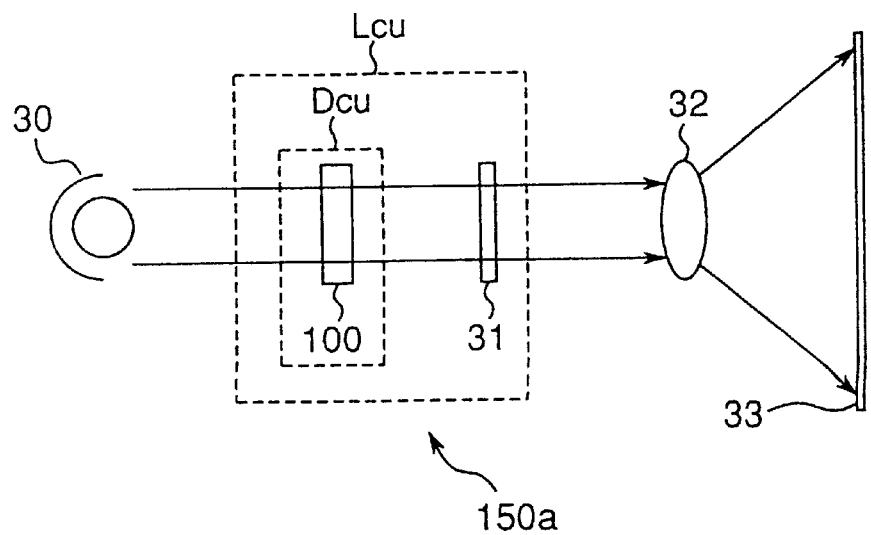
FIG. 4 is a block diagram showing a typical configuration of a projection apparatus comprising a polymer dispersed LCD element according to a first embodiment of the present invention.
Figure 5:
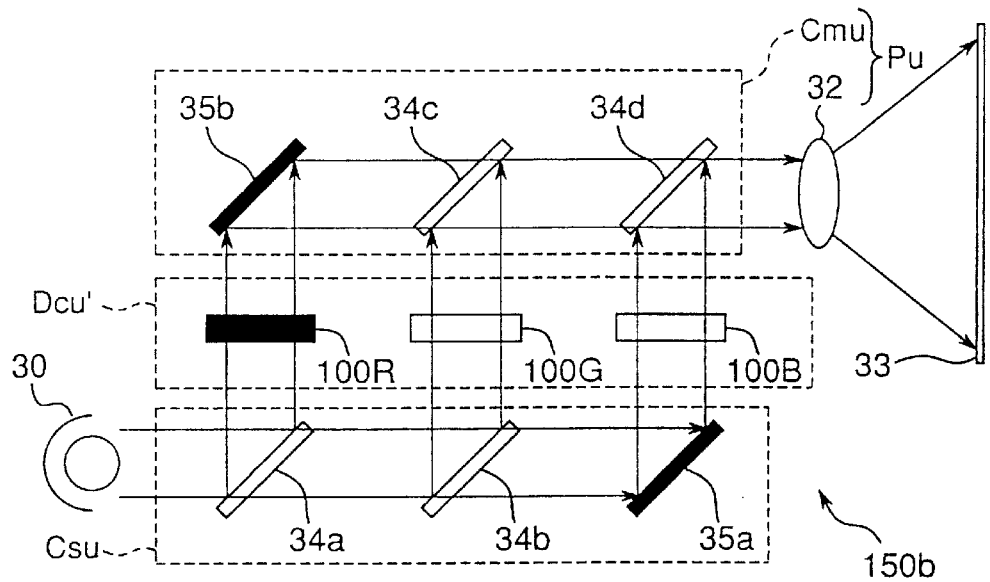
FIG. 5 is a block diagram showing a typical alternative configuration of the projection apparatus shown in FIG. 4.

A voltage corresponding to the brightness of each pixel in the image to be displayed is to the liquid crystal layer 107 by supplying a signal output from an external drive circuit (not shown in the figure) to the LCD element 110 thus comprised, and when incident light from a backlight such as light source 30 shown in FIG. 4 and FIG. 5, for example, is received, an image is displayed on the LCD element 110.

The specific materials and manufacturing method used in the production of a LCD element 110 according to the present embodiment are described next with reference to FIG. 11. Using a thermosetting resin as the resin material (called the seal resin below), the sealing material 103a, 103b, and 103c is formed by a screen printing process.

Figure 11:
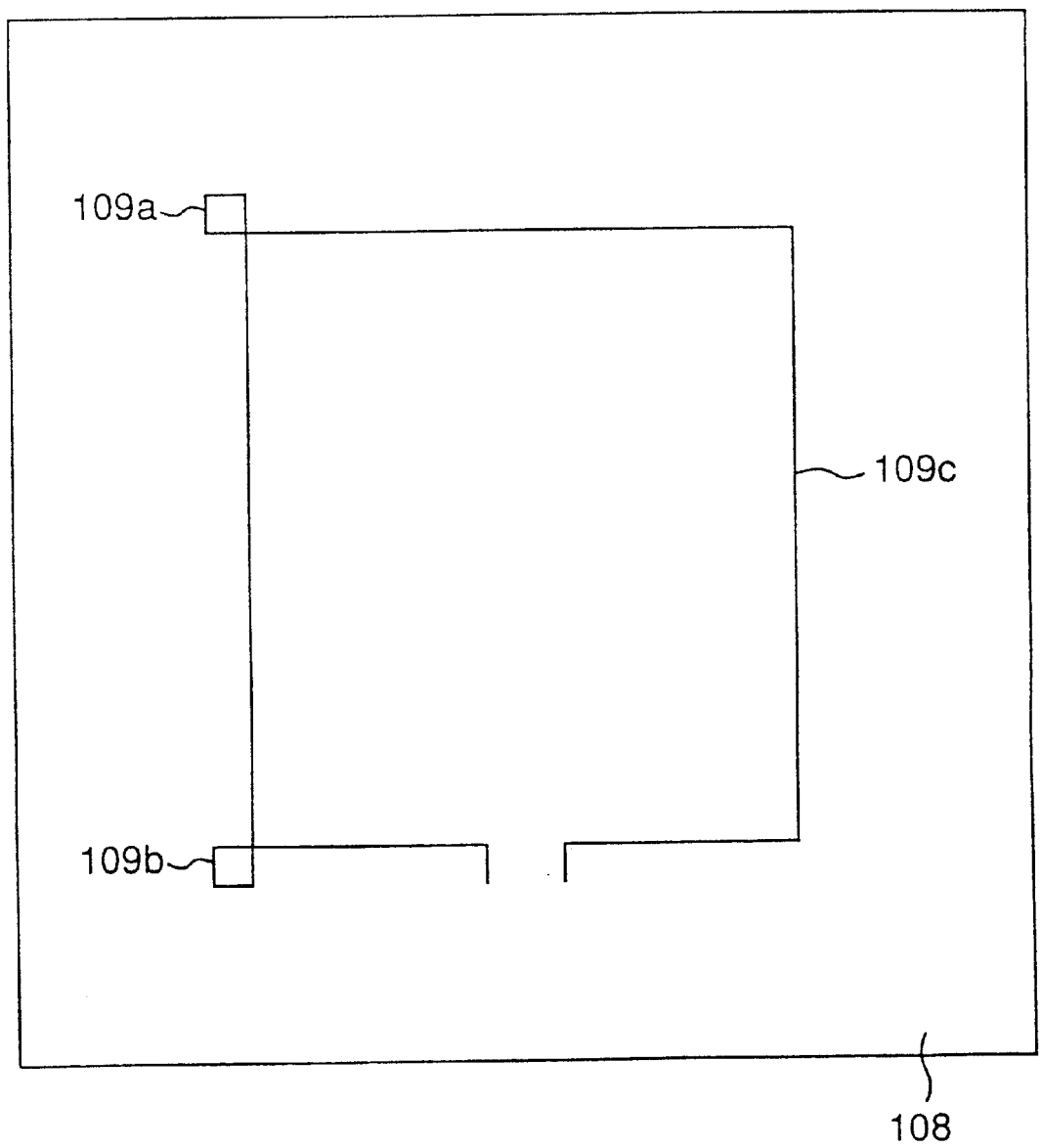
FIG. 11 is a plan view of a screen-print pattern for forming a seal member shown in FIG. 10.
Figure 12:
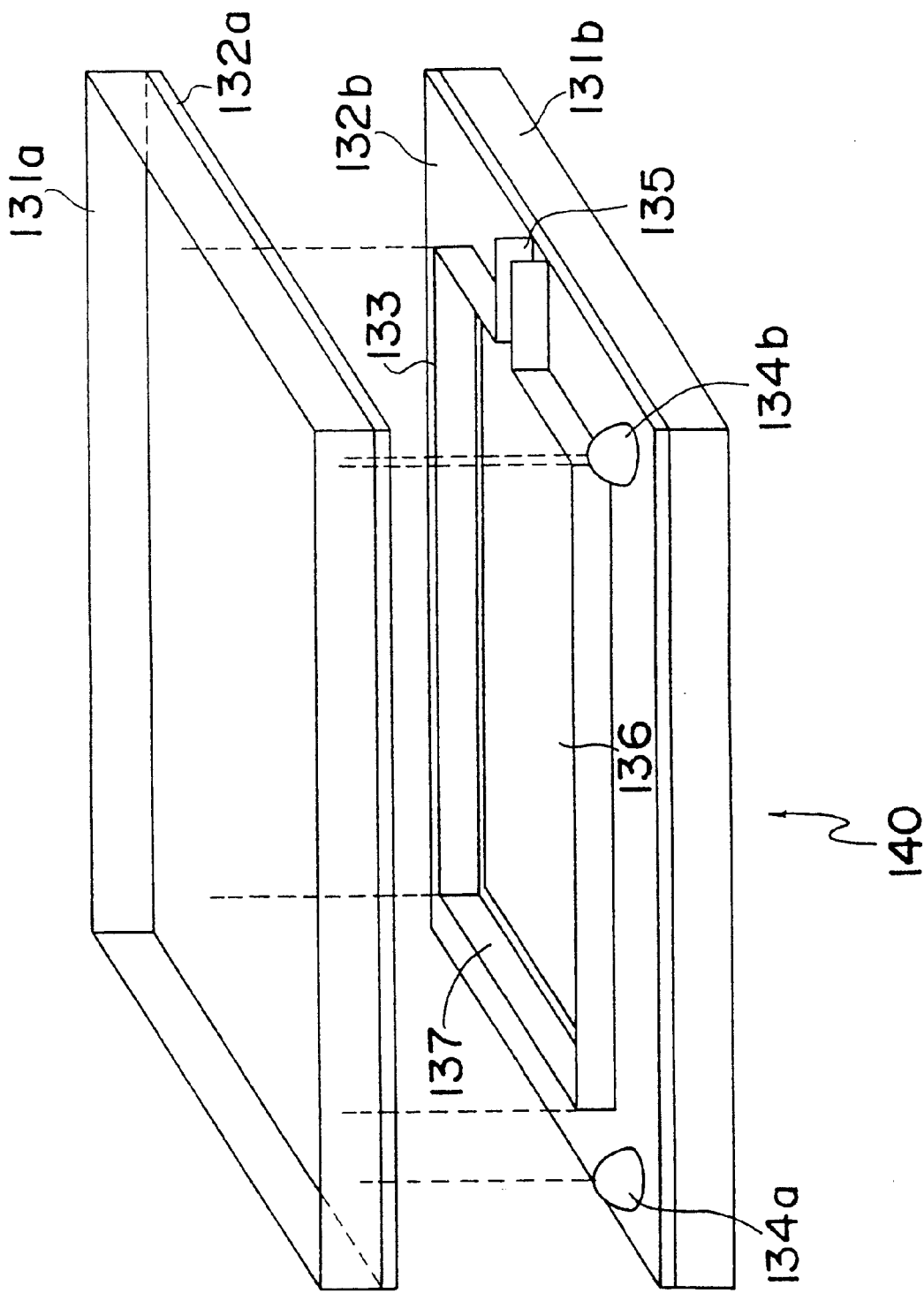
FIG. 12 is a partially exploded perspective view showing a typical configuration of a conventional liquid crystal display element.

The screen 108 for printing the sealing material 103a, 103b, 103c is shown in FIG. 11. Print patterns 109a, 109b, and 109c for forming the sealing material 103a, 103b, and 103c are provided in the screen 108.

The seal resin is deposited on the transparent electrode 102b in a specific pattern by passing it through the print patterns 109a, 109b, and 109c. When the seal resin on the transparent electrode 102b is cured by heating at 85° C. for ten minutes, sealing material 103a, 103b, and 103c is formed.

It should be noted that a photosetting resin that is cured by irradiation with ultraviolet rays or other light can be used as the seal resin in place of a thermosetting resin. Moreover, a resin with thermosetting and photosetting properties can be used, or a resin that is a combination of a thermosetting resin and a photosetting resin, that is, a resin that is cured through both heating and ultraviolet irradiation processes, can be used as the seal resin. When a resin that is cured through two processes is used, a seal material with greater reliability in terms of seal performance can be achieved.

In addition to a screen printing method, a dispenser writing method can be used as the method of forming the sealing material 103a, 103b, and 103c. In this dispenser writing method, a supply apparatus called a dispenser is moved while feeding the seal resin from the tip of the dispenser to draw the sealing material 103a, 103b, and 103c in a particular pattern on the transparent electrode 102b.

Irrespective of what method is used, the sealing materials 103a and 103b are formed using the materials and method for forming the sealing material 103c in the process forming the sealing material 103c. Therefore, the sealing material 103a and 103b of the present invention do not require a special process separate from that for forming the sealing material 103c.

After curing the sealing material 103a, 103b, and 103c, a conductive paste is coated inside the sealing material 103a and 103b as the conductive material 104a and 104b. It should be noted that in addition to a conductive paste, it is also conceivable to use metal balls of, for example, gold or silver, as the conductive material 104a and 104b.

Crosslinked polymer microparticles with an average particle diameter Dav of 9.0 $\mu$m distributed on glass plate 101a in a density N of approximately 100 pcs/mm$^2$ are used as the spacers 16 (not shown in FIG. 10) for maintaining a constant thickness Tc of the liquid crystal layer 17 interposed between glass plates 101a and 101b, that is, a constant gap between the glass plates 101a and 101b. The glass plates 110a and 101b are then combined with the transparent electrodes 102a and 102b on the inside, compressed uniformly with a pressure of approximately 1 kg/cm$^2$, and heated for approximately 2 hrs at 150° C. to produce an empty cell with an approximately 8.8 $\mu$m cell thickness.

A liquid crystal material is then injected using a vacuum injection method to the empty cell thus produced. It is also possible to use a normal pressure injection method or pressurized injection method instead of a vacuum injection method.

Next, while continuing to apply pressure from the outside using a press apparatus to the liquid crystal-injected empty cell, seal resin is coated to the opening 105. The opening 105 is then sealed by irradiating the coated seal resin with ultraviolet light.

Liquid crystal material is not observed even when observed with a microscope around the conductive material 104a and 104b of the LCD element 110 thus formed. That is, by forming a sealing material 103a and 103b surrounding the conductive material 104a and 104b according to the present invention, penetration of liquid crystal material to the area around the conductive material 104a and 104b can be prevented when the empty cell is filled with liquid crystal material.

The LCD element 110 is then cleaned ultrasonically using a mixed solution of ethanol and water. No change in the conductive material 104a and 104b is observed even when again observed microscopically after cleaning.

As described in detail above, the LCD element 110 according to the present embodiment comprises a liquid crystal layer 107 of only liquid crystal material, but the present embodiment of the invention can also be applied to a polymer dispersed type of liquid crystal display element.

This polymer dispersed liquid crystal display element is a liquid crystal display element having, in place of a liquid crystal layer filled only with liquid crystal material, a liquid crystal layer 107 in which liquid crystal droplets are dispersed in a polymer composite with a three-dimensional network structure, or liquid crystal droplets linked in a network pattern.

In this case, a composite material comprising a precursor material that becomes the polymer (called a "prepolymer") and a liquid crystal material is injected to the above empty cell using a vacuum injection method. After the opening 105 is sealed by the same method, the composite material in the liquid crystal layer 107 is irradiated for five minutes with ultraviolet light at an intensity of 50 mW/cm$^2$. As a result, the prepolymer in the cell is polymerized while at the same time the liquid crystal material and polymer composite are phase separated, resulting in a liquid crystal layer comprising liquid crystals and a polymer matrix.

The LCD element 110 has also been described in the present embodiment as a transparent liquid crystal display element that is a pair of counter substrates where both substrates are transparent glass panels comprising a transparent electrode. In addition to the above-described mode of the present embodiment, however, a reflecting liquid crystal display element having the benefits of the present invention can be achieved by using, for example, a reflective electrode for reflecting light in place of transparent electrode 102a.

One conceivable means of building a reflective LCD element is to provide a reflective electrode segmented for each pixel in the active element formation unit 106 in place of a transparent electrode segmented for each pixel and connected to a TFT element.

Yet further, the LCD element 110 of the present embodiment has been described as comprising a transparent electrode and TFT element as a switching means for each pixel. However, the present invention can also be applied to a simple matrix type liquid crystal display element not having a transparent electrode and switching means for each pixel.

By forming a seal material that is a protective member around the conductive material for electrically connecting two transparent electrodes as described above according to the present invention, the conductive material can be protected from contamination, for example, when liquid crystal material, for example, penetrating the area outside the seal between substrates is removed by cleaning.

Embodiment 3

Figure 13:
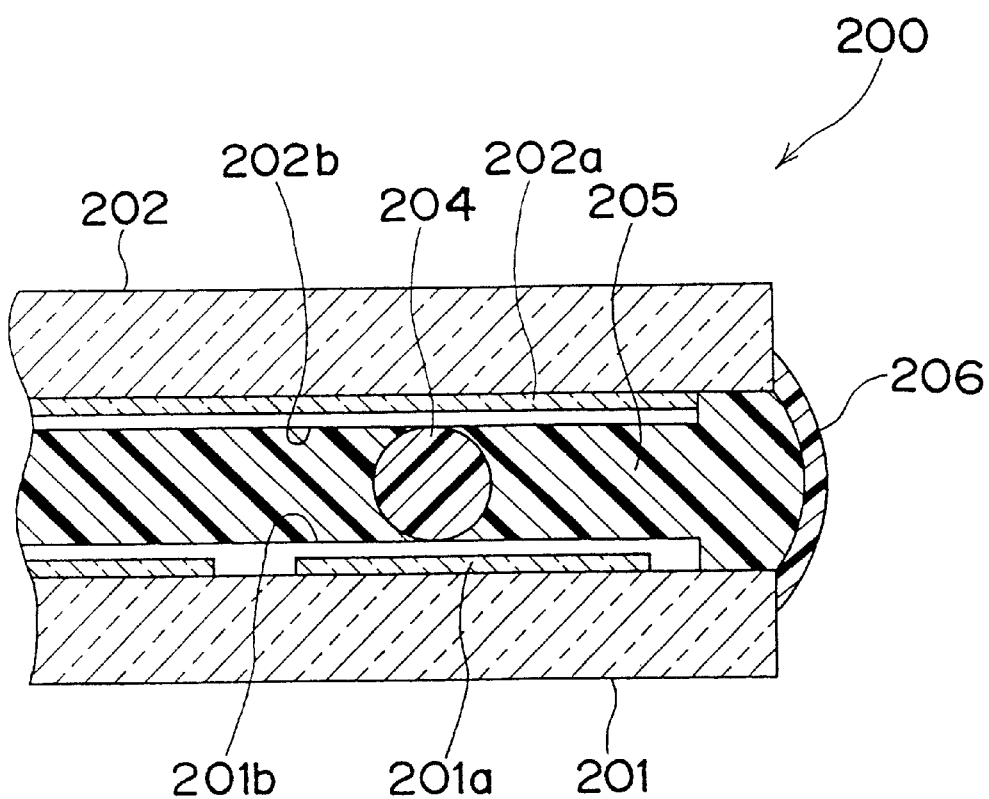
FIG. 13 is a side section showing in brief the major structure of a liquid crystal panel at a semi-finished stage in the production process of a liquid crystal display panel according to a third embodiment of the present invention.
Figure 14:
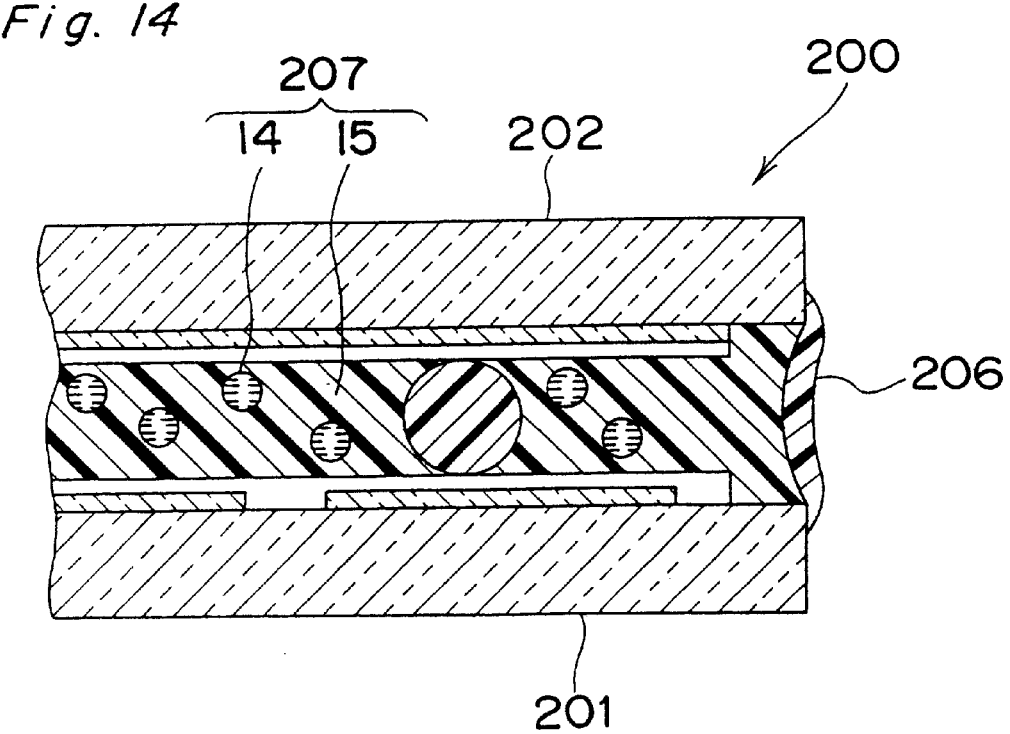
FIG. 14 is a side section showing in brief the finished major structure of liquid crystal panel shown in FIG. 13.
Figure 15:
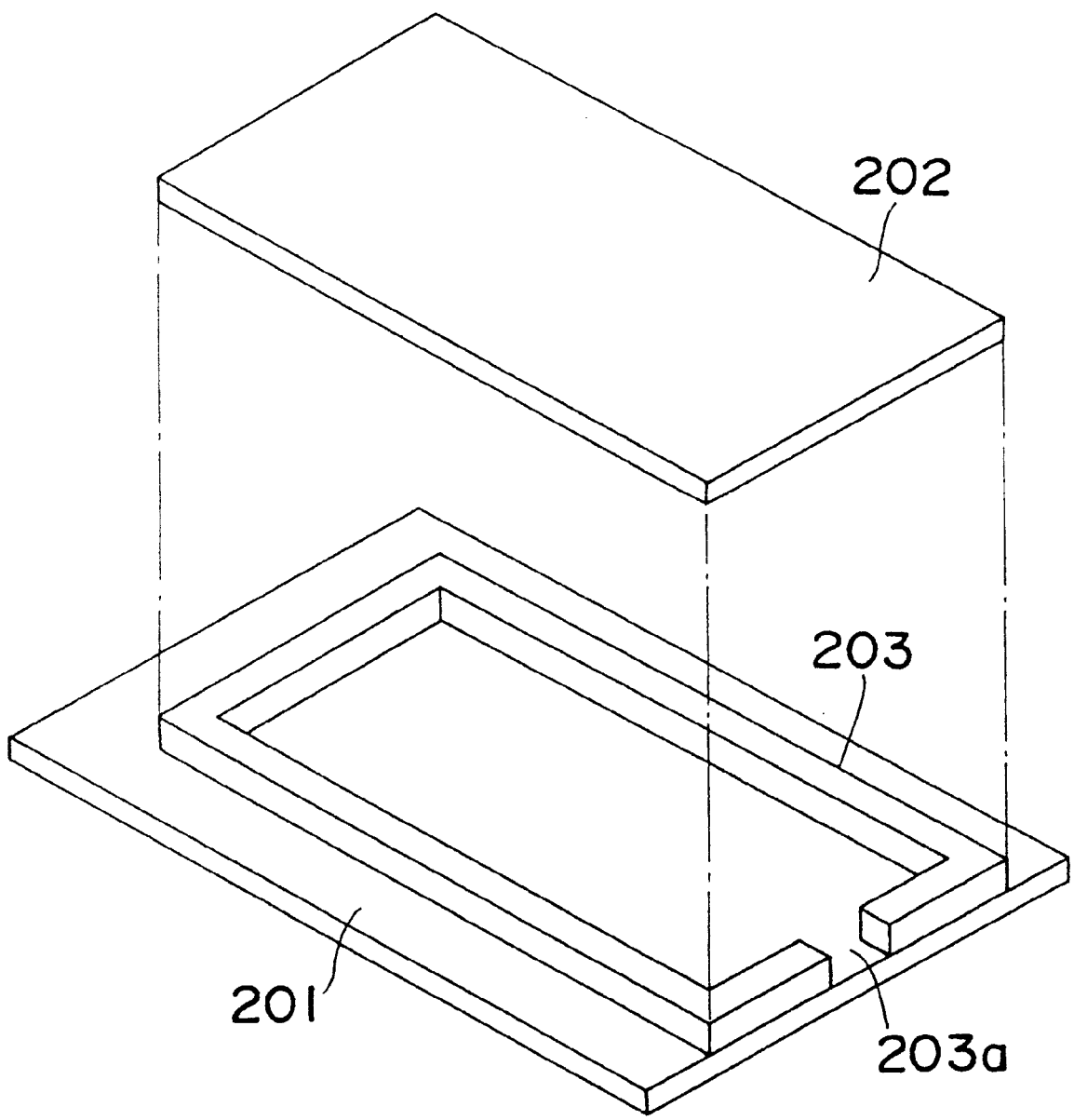
FIG. 15 is a partially exploded view showing various stages in the production of a LC panel 100.

A manufacturing method for a liquid crystal panel according to a third embodiment of the present invention for achieving the third object is described below with reference to FIG. 13, FIG. 14, FIG. 15, FIG. 16, FIG. 17, FIG. 18, FIG. 19, FIG. 20, FIG. 21, and FIG. 22. The configuration of the major components of a liquid crystal panel 200 at an intermediate stage of production by means of a manufacturing method according to the present embodiment is shown in FIG. 13. The configuration of the major components of a liquid crystal panel 200 is shown in brief after completion of production by means of a manufacturing method according to the present embodiment is shown in FIG. 14. A liquid crystal panel 100 at an intermediate stage of production is shown in FIG. 15. It should be noted that because a liquid crystal panel 200 can be applied to both a LCD element 100 according to the above-described embodiments of the present invention, and a conventional polymer dispersed liquid crystal panel, the present embodiment is described with reference to a conventional liquid crystal display element for simplification of the description.

To manufacture a liquid crystal panel 200, a pair of transparent glass plates 201 and 202 are first prepared as shown in FIG. 13 and then washed after forming transparent conductive films 201a and 202a (conductive layer of ITO) in a specific pattern on the surfaces of glass plates 201 and 202, respectively. An alignment layer comprising an insulation layer 201b and 202b is then formed by printing over transparent conductive films 201a and 202a, and insulation layers 201b and 202b are then baked on by heating for one minute at 80° C. and then for 30 minutes at 220° C.

A seal resin 203 in which injection opening 203a is formed is then coated around the perimeter of one of the glass plates 201, and spacers 204 (FIG. 13), for example, spherical particles of SiO$_2$ with a 13 $\mu$m diameter, for maintaining a specific substrate gap are distributed on the other glass plate 202. The glass plates 201 and 202 are then bonded face to face with seal resin 203 therebetween. Note that the resin seal 203 shall not be limited to a thermosetting resin, and can be a photosetting resin.

The mixture 205 of liquid crystal and polymer constituting a polymer dispersed liquid crystal is made of, for example, a polymer resin comprising 1.8 wt % polyester acrylate and 18 wt % 2-ethylhexyl acrylate, 80 wt % liquid crystal, 0.2 wt % photosetting initiator and a polymerization initiator. After curing the resin seal 203 by a heat process or light irradiation process to produce an empty panel comprising a pair of glass plates 201 and 202, the adjusted mixture 205 is injected into the empty panel unitized by means of the resin seal 203 using a conventional vacuum injection method to fill the space between the glass plates 201 and 202 with the mixture 205.

Figure 16:
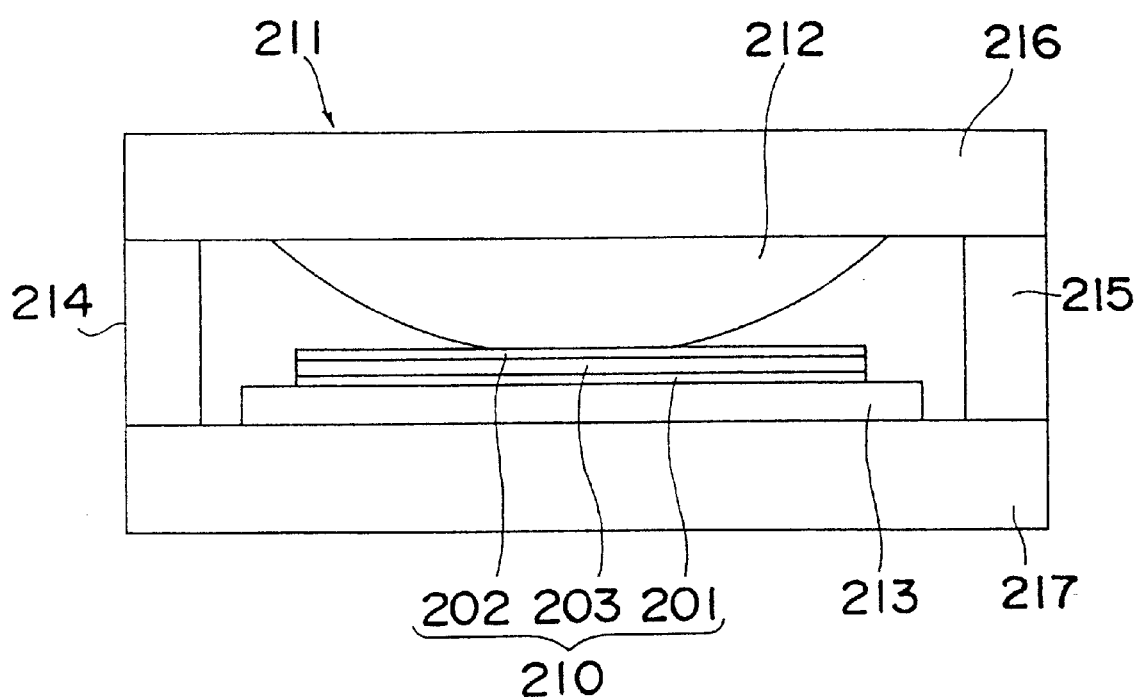
FIG. 16 is a side section view showing a semi-finished, mixture-filled, liquid crystal panel when placed in a compression apparatus according to the present invention.

A press apparatus 211 for pressing inward on the glass plates 201 and 202 placed therein when sealing the injection opening 203a of the semi-finished liquid crystal panel 210 is shown in FIG. 16. Note that in this figure a top plate 216 and bottom plate 217 of the press apparatus 211 are positioned with a specific dimensional precision by means of right and left side walls 214 and 215. A sac-shaped silicon rubber member 212 that is inflated like a balloon by injecting $N_2$ gas therein is disposed on the bottom surface of the top plate 216. A stage 213 formed to a specific dimensional precision is formed on the top of the stage 213. It should be noted that bottom plate 217 and bottom plate 217 are made of a material and configuration with good light transmitting properties. With the liquid crystal panel 210 placed on the stage 213, the silicon rubber member 212 is inflated to apply pressure to the glass plate 201 of the liquid crystal panel 210.

Figure 17:
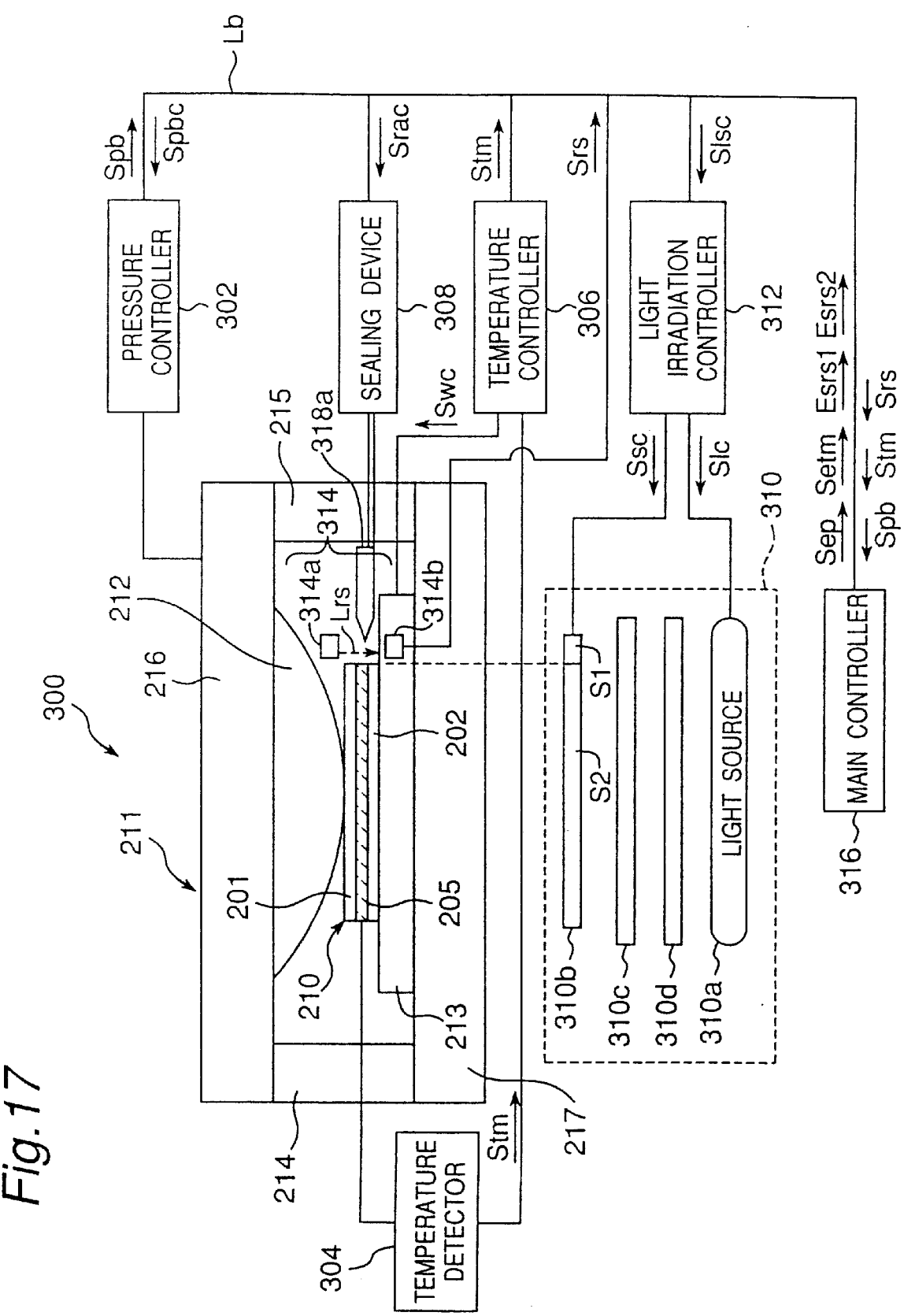
FIG. 17 is a block diagram showing a typical configuration of a liquid crystal panel sealing apparatus for a according to the present invention.

A liquid crystal panel sealing apparatus comprising this press apparatus 211 is described with reference to FIG. 17, FIG. 18, and FIG. 19. As shown in FIG. 17, a sealing apparatus 300 according to the present invention comprises a pressure control means 302, temperature detector 304, temperature control means 306, sealing means 308, light source 310, light source controller 312, mixture detection means 314, and a main controller 316.

The pressure control means 302 is connected to the silicon rubber member 212, controls the pressure Pb of the silicon rubber member 212 pressing against the glass plate 201 of the liquid crystal panel 210 by adjusting the amount of $N_2$ gas injected to the silicon rubber member 212, and generates a pressure signal Spb indicative of said pressure Pb.

The temperature detector 304 measures the temperature of the mixture 205 inside the liquid crystal panel 210 using thermography or other non-contact measurement, and generates a temperature signal Stm indicative of the temperature Tm of measured mixture 205.

The temperature control means 306 is connected to the temperature detector 304, and controls the temperature Tm of the liquid crystal panel 210 by driving a temperature adjustment device contained in the stage 213 for circulating hot or cold water to heat or cool appropriately based on temperature signal Stm when the mixture temperature Tm is outside a specific allowable temperature range β, that is $$Tm-\beta1<Tm<Tm+\beta2$$

(where $\beta1<\beta2$).

The light source 310 is disposed below the liquid crystal panel 210, that is, on the side opposite silicon rubber member 212, and contains a light bulb 310a for irradiating the liquid crystal panel 210 with light L of a specific output through the silicon rubber member 212 and bottom plate 217. It also contains interposed between the light bulb 310a and press apparatus 211 a shutter 310b for blocking and passing light L illuminating the liquid crystal panel 210.

Interposed between the light bulb 310a and shutter 310b are a UV removal filter 310c for removing a part of the ultraviolet component of the light L, and an infrared removal filter 310d for removing the infrared component.

Note that the shutter 310b comprises a first shutter S1 and a second shutter S2, which are selectively or simultaneously opened by the light source controller 312. The second shutter S2 can open to an area substantially covering or greater in area than the liquid crystal panel 210, and the first shutter S1 can open to an area comparable to the end of the injection opening 203a in the liquid crystal panel 210. A shutter 310b thus comprised is preferably provided inside and as close to the top of the stage 213 as possible. The liquid crystal panel 210 is placed such that the boundary between the first shutter S1 and second shutter S2 is substantially aligned with the end of the injection opening 203a in the liquid crystal panel 210.

The light bulb 310a and shutter 310b are both connected to the light source controller 312, which controls their operation based on shutter control signal Ssc and light bulb control signal Slc.

The mixture detection means 314 comprises a laser source 314a and a receptor 314b. The mixture detection means 314 emits a laser beam Lrs to the receptor 314b substantially parallel to the edge of the injection opening 203a from a position offset to the side a specific distance (Drs) from the end portion of the injection opening 203a in the liquid crystal panel 210 positioned in the press apparatus 211, and generates a binary interrupt detection signal Srs that goes high when the laser beam Lrs is interrupted.

The pressure control means 302, temperature detector 304, temperature control means 306, sealing means 308, light source 310, light source controller 312, and mixture detection means 314 are connected via bus Lb to the main controller 316, and thereby exchange the above-noted and other signals with the main controller 316. More specifically, the main controller 316 determines the operation of and generates various control signals controlling the various parts of the sealing apparatus 300 based on the pressure signal Spb supplied from the pressure control means 302 via the bus Lb, the temperature signal Stm supplied from the temperature detector 304 and temperature control means 306, and the interrupt detection signal Srs supplied from the mixture detection means 314, and supplies said control signals to the respective parts via bus Lb.

In other words, a sealing control signal Srac controlling the operation coating the seal resin 206 to the injection opening 203a is generated based on the pressure signal Spb, interrupt detection signal Srs signal, and temperature signal Stm, and is supplied to the sealing means 308. In addition, a temperature control signal Stmc for appropriately maintaining a temperature of the mixture 205 in the liquid crystal panel 210 is generated based on the temperature signal Stm, and is supplied to the temperature control means 306.

A light source control signal Slsc specifying the operation of the light bulb 310a and shutter 310b is generated based on the interrupt detection signal Srs, and is supplied to the light source controller 312. Then, based on this light source control signal Slsc, the light source controller 312 generates the light bulb control signal Slc controlling driving the light bulb 310a, and generates the shutter control signal Ssc controlling driving the first shutter S1 and second shutter S2 of the shutter 310b.

Figure 19A:
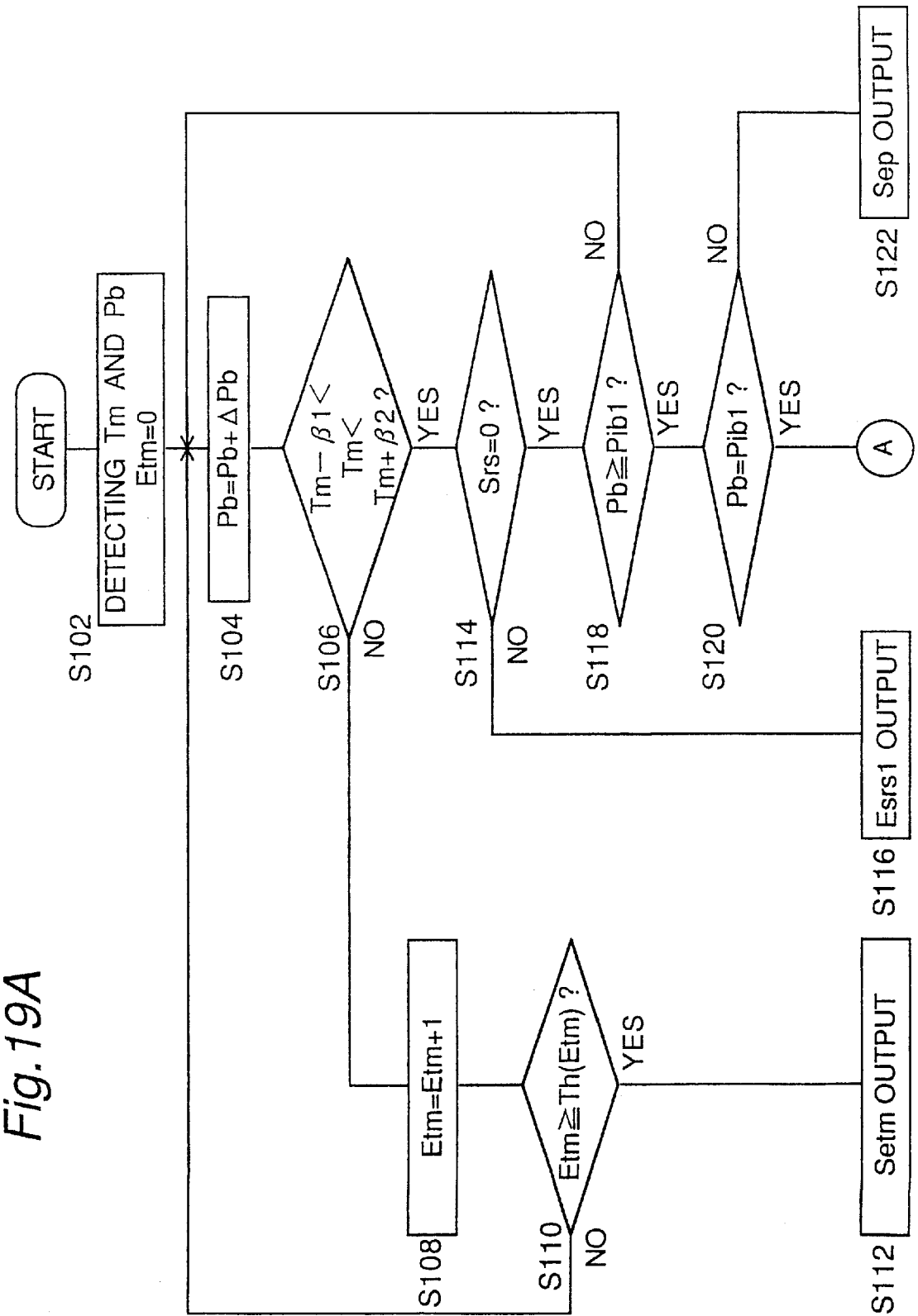
FIG. 19A and FIG. 19B flow charts of the detailed operations of the sealing apparatus shown in FIG. 17.
Figure 19B:
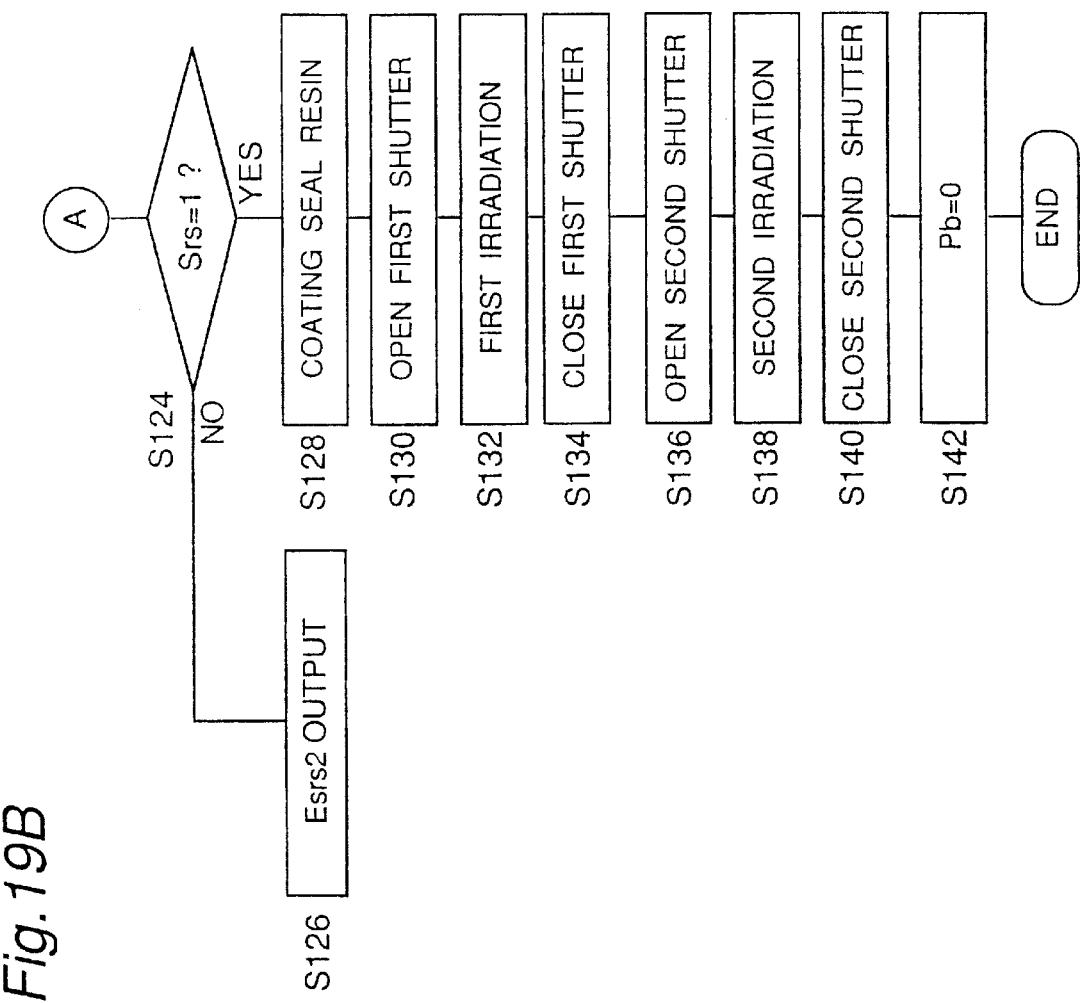
Figure 21:
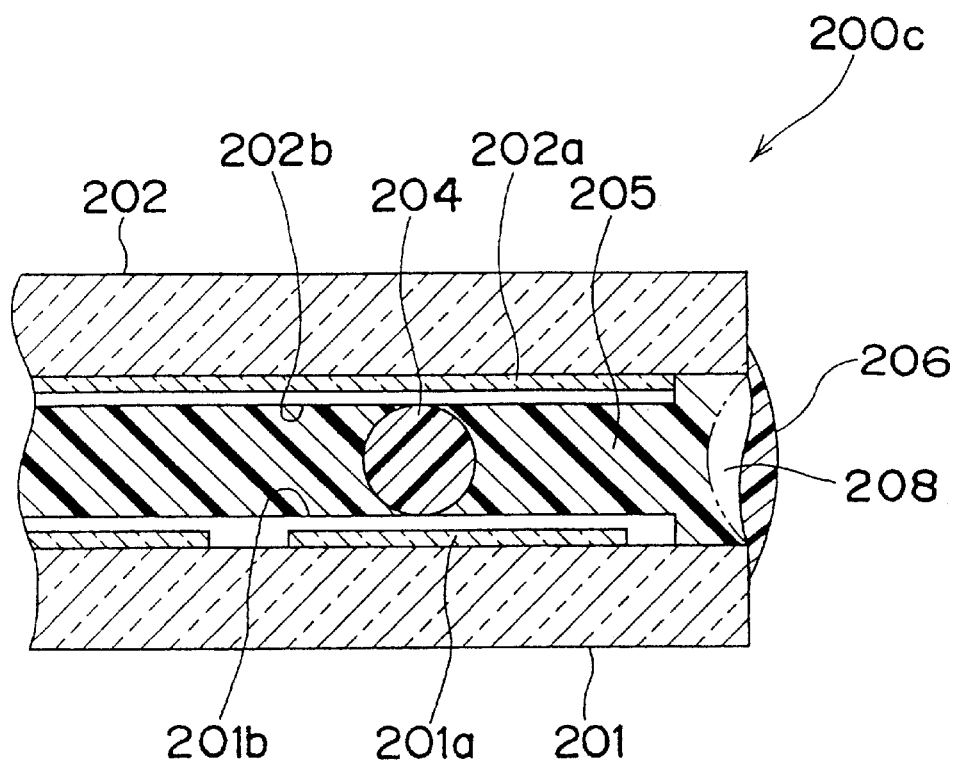
FIG. 21 is a side section showing in brief the major structure of a conventional polymer dispersed liquid crystal panel at a semi-finished stage in the production process.
Figure 22:
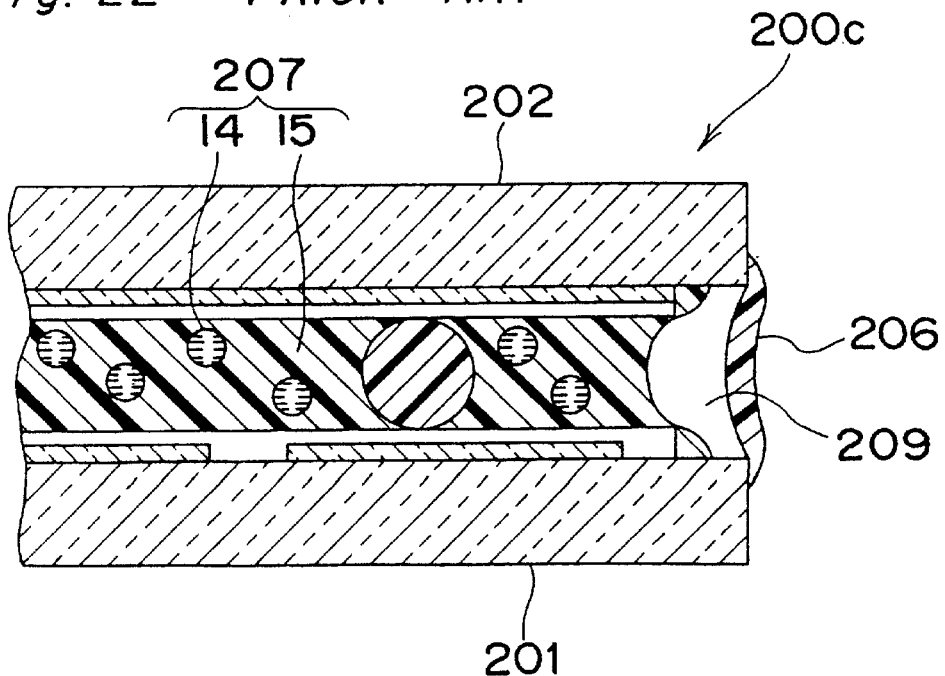
FIG. 22 is a side section showing in brief the major structure of a conventional liquid crystal panel shown in FIG. 22 [sic] when finished.

Next, after briefly describing the operation of the sealing apparatus 300 according to the present invention with reference to the flow chart in FIG. 18, operation is described in detail with reference to the flow charts shown in FIG. 19A and 19B. The sealing operation begins immediately after first setting the liquid crystal panel 210 such that the end portion of the injection opening 203a is positioned at the boundary between the first shutter S1 and second shutter S2 as shown in FIG. 16.

At block #100 in FIG. 18, the temperature signal Stm indicative of the temperature Tm of the mixture 205 in the liquid crystal panel 200 detected by the temperature detector 304 is supplied to the main controller 316 through the temperature control means 306. A feedback control process is begun whereby the main controller 316 generates the temperature control signal Stmc and controls the temperature control means 306 as described above so that the mixture temperature Tm is within a specific range Tβ (Tm−β1<Tm<Tm+β2). In addition, the main controller 316 detects leakage of the mixture 205 from the injection opening 203a based on the interrupt detection signal Srs from the mixture detection means 314, and based on said detection timing, determines whether the amount of mixture 205 filled to the liquid crystal panel 210 in the preceding process is appropriate.

In block #200, the main controller 316 outputs the pressure signal Spbc to the pressure control means 302, and pressurizes the silicon rubber member 212 to a specific sealing pressure Pib1 to compress the glass plate 201 for a specific pressurization time Tpb1.

In block #300, the main controller 316 outputs the sealing control signal Srac to the sealing means 308 to seal the injection opening 203a with seal resin 206 when the temperature and fill amount of the mixture 205, detection of which was begun in block #100, are appropriate.

In block #400, the main controller 316 outputs the light source control signal Slsc to the light source controller 312. The light source controller 312 then controls the light bulb 310a and shutter 310b to irradiate and cure the seal resin 206 and mixture 205 under specific irradiation conditions.

In block #500, the main controller 316 outputs the pressure signal Spb to the pressure control means 302 to cancel pressurizing the silicon rubber member 212.

The operation of the sealing apparatus 300 is described in detail below with reference to FIG. 19A and FIG. 19B.

At step S102, the mixture temperature Tm is detected by the temperature detector 304, the pressurization pressure Pb of the silicon rubber member 212 is detected by the pressure control means 302, and temperature signal Stm and pressure signal Spb respectively indicative thereof are input to the main controller 316. In addition, a temperature error time parameter Etm indicative of the time mixture temperature Tm is outside the allowable temperature range Tβ is set to zero.

At step S104, the main controller 316 outputs the pressure signal Spbc to the pressure control means 302 to increase the pressurization pressure Pb of the silicon rubber member 212 a specific pressure increase ΔPb. Note that the pressurization of the silicon rubber member 212 and compression of the glass plate 201 in the present step and the following step S120 are described in further detail below with reference to FIG. 20.

At step S106, the main controller 316 determines whether the mixture temperature Tm is within the allowable temperature range Tβ based on the temperature signal Stm. If the mixture temperature Tm is outside the allowable temperature range Tβ, control advances to step S108.

At step S100, the temperature error time parameter Etm is incremented one, and control steps to the next step S110.

At step S110, it is determined whether the temperature error time parameter Etm exceeds a specific maximum allowable temperature error time parameter Th(Etm). If Etm is less than Th(Etm), a "no" results and control loops back to step S104. However, if Etm is equal to or greater than Th(Etm), a "yes" results, and control advances to step S112.

At step S112, the main controller 316 outputs a mixture temperature error signal Sctm indicative of an inappropriate temperature Tm in the mixture 205, and implements a specific error handling procedure such as stopping operation of the sealing apparatus 300. This is to prevent the occurrence of such defects as deficient quality in the polymer dispersed liquid crystals 207 (FIG. 14) comprising liquid crystals and a polymer matrix obtained by curing the mixture 205 outside an appropriate temperature range.

If, however, a "yes" results in step S106, that is, it is determined that the mixture temperature Tm is within the allowable temperature range Tβ, control advances to step S114.

At step S114, it is determined whether the interrupt detection signal Srs output from the mixture detection means 314 is zero (low). If the interrupt detection signal Srs is not zero, a "no" results and control advances to step S116.

At step S116, while the pressure of the silicon rubber member 212 is at the sealing pressure Pib1 (FIG. 20), the main controller 316 executes the above error handling process whereby a first mixture leakage error signal Esrs1 indicative of mixture 205 leaking from the injection opening 203a is output. This process is to prevent defects in the liquid crystal panel 210 resulting from such filling problems as filling the mixture 205 in an amount not in conformance with the predefined appropriate amount, or uneven distribution of the mixture 205 as a result of air trapped inside the liquid crystal panel 210.

If a "yes" results in step S114, that is, the mixture 205 has not leaked, control advances to step S118.

At step S118, it is determined whether the pressurization pressure Pb is greater than or equal to the sealing pressure Pib1. If "no" results, control loops back to step S104, and the process from step S104 to S118 repeats until it reaches the sealing pressure Pib1. However, if "yes" results, control advances to the next step S120.

At step S120, it is determined whether the pressurization pressure Pb is held at the sealing pressure Pib1 for a specific pressurization time Tpb1. If "no" results, that is, if Pb is greater than Pib1, control advances to step S122.

At step S122, a pressurization pressure error signal Sep indicative that the pressurization pressure Pb of the silicon rubber member 212 against the glass plate 201 has not reached the specific sealing pressure Pib1 is output by the main controller 316, and the above error handling process is implemented. This is to prevent defects in the liquid crystal panel 210 resulting from an excessive pressurization pressure Pb during sealing, and an insufficient amount of filler in the liquid crystal panel 210 when pressure is released after effective of the mixture 205.

However, if "yes" results in step S120, the pressurization pressure required for sealing is assured, and control advances to step S124.

At step S124, it is determined whether the interrupt detection signal Srs output from the mixture detection means 314 is 1 (high) after waiting the pressurization time Tpb1. If "no" results, detection of mixture 205 from the injection opening 203a has not been detected, and control advances to step S126.

At step S126, the main controller 316 outputs a second mixture leakage error signal Esrs2 indicative that the mixture 205 has not leaked from the injection opening 203a, and implements the above error handling process. Because this means that the mixture 205 filled not the liquid crystal panel 210 is insufficient, air 208 (FIG. 21) will be trapped inside if the seal resin 206 is coated to the injection opening 203a in this state, and this process is therefore to prevent bubbles 209 (FIG. 22) from appearing in the cured liquid crystal panel 210.

However, if a "yes" results at first shutter S124, it means that mixture 205 has leaked for the first time as a result of depressing the glass plate 201 for a specific pressurization time Tpb1 at a specific sealing pressure Pib1. That is, an appropriate amount of mixture 205 is loaded inside the liquid crystal panel 210, and a uniform distribution inside the liquid crystal panel 210 is assured; control therefore advances to the next sealing step S128.

At step S128, the main controller 316 outputs the sealing control signal Srac to the sealing means 308. The sealing means 308 seals the injection opening 203a by coating a specific amount of seal resin 206 from the resin nozzle 318a in direct contact with the leaked mixture 205.

At step S130, the main controller 316 outputs light source control signal Slsc indicative of the best irradiation conditions for the seal resin 206 and mixture 205 to the light source controller 312. Based on the light source control signal Slsc, the light source controller 312 outputs a shutter control signal Ssc, and first opens the first shutter S1 positioned near the injection opening 203a.

At step S132, the light source controller 312 outputs the light bulb control signal Slc, lights the light bulb 310a at a first specific output IP1, irradiates for a first specific time T(ip1) the seal resin 206 coated to the injection opening 203a through the aperture of the first shutter S1, and cures the seal resin 206.

At step S134, the light source controller 312 closes the first shutter S1 by means of the shutter control signal Ssc.

At step S136, the light source controller 312 opens a second shutter S2 positioned near the glass plate 202 of the liquid crystal panel 210 by means of the shutter control signal Ssc.

At step S138, the light source controller 312 lights the light bulb 310a at a second specific output IP2 by means of the light bulb control signal Slc, irradiates the mixture 205 inside the liquid crystal panel 210 for a second specific time T(ip2) through the aperture of the second shutter S2, phase separates the mixture 205 into liquid crystals 14 and polymer matrix 15, and forms the polymer dispersed liquid crystals 207.

At step S140, the light source controller 312 closes the second shutter S2 by means of the shutter control signal Ssc.

At step S142, the pressurization pressure Pb is reduced and the process terminated.

The liquid crystal panel 210 according to the present invention can thus be manufactured as described above. Note that steps S106, S108, S110, and S112 constitute a mixture temperature control routine for assuring the temperature of the mixture 205, and can be eliminated if temperature control of the mixture 205 by means other than the sealing apparatus 300, for example, by environmental control, is possible.

In addition, steps S114 and S116 constitute a sealing assurance routine for preventing overfilling and uneven filling of the mixture 205, and forcibly preventing sealing defects of the injection opening 203a by the seal resin 206. However, this routine can also be eliminated if it is possible to control the filling quality of the mixture in a process preceding the sealing apparatus 300.

Furthermore, steps S124 and S126 constitute a void prevention routine whereby it is possible to prevent insufficient filling of the mixture 205, and thus prevent bubbles 209 in the finished polymer dispersed liquid crystals 207 resulting from intermixing of air 208 in the mixture 205. As with the sealing assurance routine above, this routine can be eliminated if it is possible to control the filling quality of the mixture in a preceding process.

Moreover, steps S130, S132, S134, S136, S138, and S140 implement a two-stage irradiation process whereby the seal resin 206 and mixture 205 are exposed to a cure light by the light source controller 312 under separate conditions. Note that by providing the shutter 310b with an independently operable first shutter S1 and second shutter S2, the light shield that conventionally must be placed around and removed from the liquid crystal panel 210 each time to avoid the affects of light emissions for other parts is not needed. In addition, when the same irradiation conditions can be used for the seal resin 206 and mixture 205, the first shutter S1 and second shutter S2 can be simultaneously opened and closed in a so-called single-stage irradiation process. Yet further, it will be obvious that the shutter 310b can be built using not two but one shutter unit S.

The process of pressing on the glass plate 201 in the present invention assured by the previous steps S104, S118, and S120 is described in detail below with reference to FIG. 20. The top part of FIG. 20 shows the bottommost edge of the silicon rubber member 212 positioned at approximately the center of the glass plate 201. The middle shows the bottommost edge of the silicon rubber member 212 positioned at the opposite side end of the injection opening 203a of the silicon rubber member 212. The bottom shows the relationship between pressing pressure Pib and pressing time t at a desired position on glass plate 201.

First, when the silicon rubber member 212 is positioned to the middle of the glass plate 201 as shown at the top of the figure, the silicon rubber member 212 is assumed to make contact at the origin (X=0) of the X axis where the X axis represents a planar position on the glass plate 201. The internal pressure Pib of the silicon rubber member 212 is then increased as the silicon rubber member 212 is inflated by injecting $N_2$, thereby gradually pressing on glass plate 201 to the left Dl and right Dr directions from the origin (X=0). That is, the farther separation distance XS from the origin, the more slowly glass plate 201 is pressed. If the length of the glass plate 201 is L, this separation distance XS is $0 \leq XS \leq L/2$ at the top, and $0 \leq XS \leq L$ in the middle. The delay time at separation distance XS is expressed as T(XS) when the expansion rate of the silicon rubber member 212 is constant. This relationship is shown on the bottom.

When the entire surface of the glass plate 201 is pressed at a specific pressure Pib1 by the silicon rubber member 212 after the maximum delay time T(XS)max, pressurization is stopped by the pressure control means 302, and pressurization at pressure Pib1 is held for a specific pressurization time Tpb1.

As a result, as shown at the top, the mixture 205 in the middle is pressed through the glass plate 201 and spreads to the sides, and as the silicon rubber member 212 expands, is gradually pushed out from the middle to the sides. The spread mixture 205 is then, pushed against the side wall of the liquid crystal panel 210 on the side opposite the injection opening 203a, producing a force pushing in the direction of the injection opening 203a, and causing the mixture 205 to leak from the injection opening 203a. The mixture 205 is thus gradually squeezed from the middle of the liquid crystal panel 210 to the edges, reliably filling all parts of the liquid crystal panel 210.

In the middle of the figure, the pressurization pressure Pb increases such that the mixture 205 is gradually squeezed from the side opposite the injection opening 203a toward the injection opening 203a, and the mixture 205 can be filled to the liquid crystal panel 210 as shown in the top by holding a specific pressure Pib1 against the entire surface of the glass plate 201 for a pressurization time Tpb1. It should be noted that this pressurization pressure Pib1 is called the sealing pressure because block #300 is done while this specific pressure Pib1 is applied after sealing the injection opening 203a with a seal resin 206.

Note that a first specific pressure PibB1 is preferably 0.8 kg/cm$^2$, and the pressure holding time Tpb1 is 1 minute. Note that the value of pressurization pressure PiB1 and the fill amount of the mixture 205 in the liquid crystal panel 200 are predetermined so that a small amount of mixture 205 leaks from the injection opening 203a in the resin seal 203 as a result of pressing from the outside the glass plate 201 (and 202) of the liquid crystal panel 210 to which the mixture 205 is filled.

Note, further, that because the glass plates 201 and 202 are pressed from the outside, the separation gap, that is, the panel gap, between the glass plates 201 and 202 bonded via the resin seal 203 with spacers 204 interposed between is made uniform.

In addition, the seal resin 206 and mixture 205 are not just cured while holding sealing pressure Pib1, the pressure applied to the glass plates 201 and 202 from the silicon rubber member 212 of the press apparatus 211 is reduced to 0.6 kg/cm$^2$ after coating the seal resin 206, and left with this reduced pressure for one minute. This results in the seal resin 206 being pulled into the injection opening 203a together with the mixture 205 that was leaked from the injection opening 203a, thus penetrating the injection opening 203a of the resin seal 203. This reduced pressure and reduced pressure exposure time are specific values determined by the pressure reduction and time needed for the seal resin 206 to penetrate the injection opening 203a.

The seal resin 306 penetrating the injection opening 303a with the mixture 205 completely seals the injection opening 203a in contact with the mixture 205 without producing any air bubbles 208. Furthermore, while the pressure applied to the glass plates 201 and 202 is reduced in this present embodiment, it is not always necessary to make the seal resin 206 penetrate the injection opening 203a by reducing the applied pressure, and the seal resin 6 can be coated in contact with the surface of the mixture 205 leaking from the injection opening 203a of the resin seal 203.

In addition, the seal resin 206 is cured by irradiating the seal resin 206 with 40 mW/cm$^2$ of light for three minutes after removing the liquid crystal panel 210 from the press apparatus 211, and covering the entire display area with a light shield layer except at the injection opening 203a of the resin seal 203 in this liquid crystal panel 210. Thereafter, the shield layer is re moved from the liquid crystal panel 210, the display area of the liquid crystal panel 210 is irradiated with 50 mW/cm$^2$ of light for five minutes to effect phase separation of the polymer and liquid crystal mixture 205 to obtain the polymer dispersed liquid crystals 207. As a result, the seal resin 206 cured in contact with the surface of the mixture 205 is pulled into the injection opening 203a with the volume contraction of the polymer dispersed liquid crystals 207, resulting in the completed polymer dispersed liquid crystal panel as shown in FIG. 14.

It should be further noted that while the seal resin 206 is cured after removing the liquid crystal panel 210 from the press apparatus 211, the seal resin 206 can be cured (phase separated) while a 0.6 kg/cm$^2$ pressure remains applied to the glass plates 201 and 202 of the liquid crystal panel 210 in the press apparatus 211. In addition, the seal resin 206 used above shall not be limited to a photosetting resin, and a thermosetting resin or resin that sets at normal temperature can be used. When the seal resin 206 is a thermosetting resin, the seal resin 206 is cured by a heating process.

A liquid crystal panel was also prepared using a procedure identical to the conventional procedure and different from the above-described procedure, that is, by injection filling a mixture 205 of polymer and liquid crystal between the glass plates 201 and 202, coating the seal resin 206 on the outside of the injection opening 203a of the resin seal 203, and then curing this seal resin 206. When the liquid crystal panel thus prepared was compared with a liquid crystal manufactured by the manufacturing method of the present invention, it was confirmed that while there were bubbles in the liquid crystal panel produced with the conventional method and display quality was thereby degraded, no bubbles occur in the liquid crystal panel according to the present invention, the panel gap is uniform, display quality is good, and reliability is improved.

In the above manufacturing method, a liquid crystal panel is produced by applying pressure from the outside in the direction bonding the panels 201 and 202 filled with mixture 205, a seal resin 206 is coated to the outside of the injection opening 203a, the pressure applied to the panels 201 and 202 is then reduced, or the pressure is not reduced, and the seal resin 206 is cured to phase separate the mixture 205 and obtain the polymer dispersed liquid crystals 207. It is also possible, however, to achieve a liquid crystal panel using a manufacturing method comprising a procedure as described below.

First, moreover, panels 201 and 202, which are filled by injecting from an injection opening 203a of the resin seal 203 a mixture 205 of polymer and liquid crystal that becomes the polymer dispersed liquid crystals 207, are pressed from the outside in the direction bonding the panels together, and a seal resin 206 is coated to the outside of the injection opening 203a. After then removing the liquid crystal panel 210 from the press apparatus 211, the display area of the liquid crystal panel 210 is irradiated with 50 mW/cm$^2$ of light for five minutes to effect phase separation of the polymer and liquid crystal mixture 205 and obtain the polymer dispersed liquid crystals 207. The seal resin 206 coated to the outside of the injection opening 203a of the resin seal 203 bonding opposing surfaces of the glass plates 201 and 202 is then cured by irradiating the seal resin 206 with 40 mW/cm$^2$ of light for three minutes, resulting in the liquid crystal panel.

In this manufacturing method, therefore, the seal resin 206 is coated in direct contact with the surface of the mixture 205 leaded from the injection opening 203a of the resin seal 203 in the process applying pressure to the outside of the panels 201 and 202, and in the process phase separating the mixture 205, the seal resin 206 is pulled into and penetrates the injection opening 203a with the volume contraction of the polymer dispersed liquid crystals 207. With this manufacturing method also, a liquid crystal panel is produced in which bubbles do not result, the panel gap is uniform, display quality is good, and reliability is improved.

It should be noted that phase separation of the mixture 205 can occur after reducing the pressure applied to the panels 201 and 202, in which case the coated seal resin 206 and leaked mixture 205 are together pulled into the injection opening 203a in the process reducing the pressure applied to the panels 201 and 202, and the injection opening 203a is completely closed by the seal resin 206 being pulled into the injection opening 203a with the volume contraction of the polymer dispersed liquid crystals 207 in the process phase separating the mixture 205.

Moreover, panels 201 and 202 of the liquid crystal panel 210 are pressed from the outside in the direction bonding the panels together using a press apparatus 211 after preparing a pair of panels 201 and 202 with the opposing surfaces thereof bonded through a resin seal 203 in which injection opening 203a is formed, and then injection filling the space between the panels 201 and 202 with a mixture 205 of polymer and liquid crystal that becomes the polymer dispersed liquid crystals 207. After then removing the liquid crystal panel 210 from the press apparatus 211, the display area of the liquid crystal panel 210 is irradiated with 50 mW/cm$^2$ of light for five minutes to effect phase separation of the polymer and liquid crystal mixture 205 and obtain the polymer dispersed liquid crystals 207. The seal resin 206 is then coated to the outside of the injection opening 203a of the resin seal 203, and the seal resin 206 is cured by irradiation with 40 mW/cm$^2$ of light for three minutes, resulting in the liquid crystal panel 210.

However, in this manufacturing method, unlike with the above-described manufacturing method, the seal resin 206 is coated and cured to the outside of the injection opening 203a after obtaining the polymer dispersed liquid crystals 207. It has been confirmed that even when this procedure is used, a liquid crystal panel can be obtained in which air bubbles do not occur between the seal resin 206 and polymer dispersed liquid crystals 207, display quality is good, and reliability is improved. With this manufacturing method, the mixture 205 leaks from the injection opening 203a of the resin seal 203 when the panels 201 and 202 filled with the mixture 205 are pressed from the outside, and the seal resin 206 is cured after coating in direct contact with the surface of the phase separated polymer dispersed liquid crystals 207 leaked from the injection opening 203a.

Note that while the liquid crystal panel 210 is removed from the press apparatus 211 after pressing the panels 201 and 202 in this manufacturing method, the mixture 205 can be phase separated by irradiating the display area of the liquid crystal panel 210 with light while remaining compressed in the press apparatus 211. This is obvious. However, the press apparatus 211 in this case must be made from glass or other material with good light transmitting properties.

It should be further noted that in each of the above manufacturing methods the process for coating the seal resin 206 to the outside of the injection opening 203a of the resin seal 203 and curing the seal resin 206, and the process for phase separating the mixture 205 to obtain the polymer dispersed liquid crystals 207, are separately effected, but it is also possible to produce a liquid crystal panel using a manufacturing method having the following procedures.

That is, the panels 201 and 202 of the liquid crystal panel 210, which is filled with a mixture 205 of polymer and liquid crystal that becomes the polymer dispersed liquid crystals 207 injected from the injection opening 203a of the resin seal 203, are pressed inward from the outside in the direction bonding the panels together, a seal resin 206 is coated to the outside of the injection opening 203a, the entire surface of the liquid crystal panel 210 is then irradiated with 50 mW/cm$^2$ of light for five minutes to effect phase separation of the polymer and liquid crystal mixture 205, simultaneously obtaining the polymer dispersed liquid crystals 207 and curing the seal resin 206 coated to the outside of the injection opening 203a to complete the liquid crystal panel.

With this manufacturing method, the mixture 205 is leaked from the injection opening 203a of the resin seal 203 in the process compressing the panels 201 and 202 filled with the mixture 205, and the seal resin 206 coated to the surface of the mixture 205 is cured with phase separation of the mixture 205 while being pulled into the injection opening 203a with volume contraction of the polymer dispersed liquid crystals 207. Therefore, with this manufacturing method also, a liquid crystal panel is produced in which bubbles do not result, the panel gap is uniform, display quality is good, and reliability is improved.

Moreover, in the above manufacturing method, phase separation of the mixture 205 and curing the seal resin 206 are simultaneously accomplished after coating the seal resin to the outside of the injection opening 203a while pressure remains applied to the panels 201 and 202 filled with a mixture 205. This manufacturing method shall not be limited to this procedure, however, and phase separation of the mixture 205 and curing the seal resin 206 can be simultaneously accomplished after reducing the pressure applied to the panels 201 and 202 filled with a mixture 205. That is, in this manufacturing method, the mixture 205 is leaked from the injection opening 203a of the resin seal 203 in the process pressing the panels 201 and 202 filled with a mixture 205 from the outside, and in the process reducing the pressure applied to the panels 201 and 202, the leaked mixture 5 is pulled with the seal resin 206 into the injection opening 203a. Note that in the process phase separating the mixture 205, the seal resin 206 coated to the surface of the mixture 205 leaked from the injection opening 203a is cured while being pulled into the injection opening 203a with the volume contraction of the polymer dispersed liquid crystals 207. Therefore, a liquid crystal panel completed using this method is also free of air bubbles, has a uniform panel gap, good display quality, and improved reliability.

It will be obvious that the preferred modes of a manufacturing method according to the present invention shall not be limited to the above-described content, and various modifications can be made within the intended spirit and scope of the invention. The polymer material in the mixture 205 becoming the polymer dispersed liquid crystals 207 shall not be limited to the photosetting resins polyester acrylate and 2-ethylhexyl acrylate, and 2-hydroxyethyl acrylate or trimethylolpropane triacrylate can be used. The polymer material shall also not be limited to a photosetting resin, and a material such as a thermosetting resin or thermoplastic resin can also be used.

It should be further noted that transparent conductive films 201 and 202a and insulation layers 201b and 202b are formed on a surface of glass plates 201 and 202 in the present embodiment, but there is no problem if the insulation layers 201b and 202b are not formed, and one of the glass plates 201 and 202 can be an active matrix substrate on which an active element is provided.

The spacers 204 shall also note limited to $SiO_2$ particles, and other materials such as a resin or glass fiber material can be used, and spacers (fixed spacers) attached to a surface with an adhesive can also be used.

A vacuum injection method is also used in the present embodiments for injecting the mixture 205 between the pair of glass plates 201 and 202, but the invention shall not be limited to this method. For example, the following methods can be alternatively used: an injection method using a capillary action (two or more holes are formed in an empty panel, and the mixture is injected from one hole into the empty panel); a method whereby two holes are opened in an empty panel, and the mixture is pressurized while being injected from one hole into the empty panel and/or suctioned into the empty panel from the other hole at the same time; and a method whereby the mixture is first dropped onto one glass plate which is then bonded to another glass plate.

During phase separation of the mixture 205 by irradiation with light, it is also possible to use an infrared filter positioned outside of the panel disposed on the side from which light is emitted to remove heat, and the low wavelength filter improving liquid crystal reliability can be a filter for cutting wavelengths of 350 nm or less.

The press apparatus 211 is also not limited to a device comprising a silicon rubber member 212, and can be any means whereby pressure can be applied from the outside to the inside of the pair of surface bonded glass plates 201 and 202. As described above, the problem of air bubbles being left trapped between the seal resin and the polymer dispersed liquid crystal in the completed liquid crystal panel does not occur with the liquid crystal panel manufacturing method according to the present invention, and the excellent effects of achieving good display quality while providing for improved reliability can be obtained.

INDUSTRIAL APPLICABILITY

A polymer dispersed liquid crystal panel that can be used as a large screen, flat display apparatus in portable personal computers and other products in the information technology industry, and in televisions and other products in the video equipment industry, can be provided.

What is claimed is:

1. A liquid crystal display element comprising a pair of opposing substrates having a voltage application means with at least one of said substrates being transparent, a liquid crystal layer interposed between said pair of opposing substrates, and a plurality of spacers distributed in said liquid crystal layer for maintaining a uniform gap width between said substrates, said liquid crystal display element characterized by said liquid crystal layer having an internal pressure and said spacers having a replusion within a specific temperature range where a sum of the internal pressure of said liquid crystal layer and the repulsion of said spacers is equal to an atmospheric pressure.

2. The liquid crystal display element according to claim 1, wherein the liquid crystal layer has a structure in which liquid crystal droplets are dispersed in a polymer matrix or a structure in which polymer compounds are dispersed in a three-dimensional network pattern or microdroplets pattern in the liquid crystals forming continuous layers.

3. The liquid crystal display element according to claim 1, wherein the internal pressure of said liquid crystal layer is approximately 0.9 kg/cm$^2$ or less, the distribution density of the spacers is 10 or greater and 300 or less per 1 mm$^2$.

4. The liquid crystal display element according to claim 1, wherein the thickness of the liquid crystal layer within said specific temperature range is approximately equal to or less than the average particle diameter of the spacers.

5. The liquid crystal display element according to claim 1, wherein the thickness of the liquid crystal layer within said specific temperature range is approximately equal to or less than the difference of the average particle diameter of the spacers and the standard deviation of the particle diameter of the spacers.

6. The liquid crystal display element according to claim 1, wherein the thickness of the liquid crystal layer within said specific temperature range is approximately equal to or less than the difference of the average particle diameter of the spacers and twice the standard deviation of the particle diameter of the spacers.

7. The liquid crystal display element according to claim 1, wherein within said specific temperature range, a ratio of the absolute value of the variation in the thickness of the liquid crystal layer to the thickness of the liquid crystal layer is less than approximately 2.5%, and a sum of said thickness and said variation is approximately equal to or less than the average particle diameter of the spacers.

8. The liquid crystal display element according to claim 1, wherein within said specific temperature range, a ratio of the absolute value of the variation in the thickness of the liquid crystal layer to the thickness of the liquid crystal layer is less than approximately 2.5%, and a sum of said thickness and said variation is approximately equal to or less than the difference of the average particle diameter of the spacers and the standard deviation of the particle diameter of the spacers.

9. The liquid crystal display element according to claim 1, wherein within said specific temperature range, a ratio of the absolute value of the variation in the thickness of the liquid crystal layer to the thickness of the liquid crystal layer is less than approximately 2.5%, a sum of said thickness and said variation is approximately equal to or less than the difference of the average particle diameter of the spacers and twice the standard deviation of the particle diameter of the spacers.

10. The liquid crystal display element according to claim 1, wherein said spacers are resin beads.

11. The liquid crystal display element according to claim 1, wherein said spacers have a light blocking ability.

12. The liquid crystal display element according to claim 1, wherein said specific temperature range is approximately from 0° C. to 85° C.

13. The liquid crystal display element according to claim 1, wherein said pair of opposing substrates are transparent substrates with a voltage application means comprising a transparent electrode.

14. The liquid crystal display element according to claim 13, wherein at least one electrode of said voltage application means is a plurality of electrodes, and a switch means is connected to each of said plurality of electrodes.

15. A projection apparatus using a liquid crystal display element, and characterized by comprising a light source, a screen, a light control means for producing an image by controlling transmission of incident light from said light source using a liquid crystal display element according to claim 13, and a projection means for projecting said image to said screen.

16. The projection apparatus according to claim 15, wherein said light control means comprises a liquid crystal display element for generating a gradation image from said incident light, and a color filter for converting said gradation image to a color image.

17. The projection apparatus according to claim 15, wherein said light control means comprises a color separation means for separating incident light from said light source into primary colors of red, green, and blue, and a density control means comprising a liquid crystal display element for each primary color, and generating a gradation image for each of said primary colors by controlling each liquid crystal display element to regulate the transmission of each primary color from the color separation means, and the projection means mixes gradation images of each primary color, and projects a color image to the screen.

18. The projection apparatus according to claim 17, wherein said projection means comprises a color mixing means for generating a color image by mixing gradation images of each primary color, and a projection lens for projecting a color image from said color mixing means to the screen.

19. The liquid display element according to claim 1, wherein regarding said pair of opposing substrates, and regarding said voltage application means of at least one of which is a transparent substrate, a transparent electrode is disposed to said transparent substrate, and a reflective electrode is disposed to another substrate.

* * * * *